US008739418B2

(12) United States Patent
Okumi et al.

(10) Patent No.: US 8,739,418 B2
(45) Date of Patent: *Jun. 3, 2014

(54) ENGINE-DRIVEN CUTTER

(75) Inventors: Masayoshi Okumi, Anjo (JP); Masaki Kondo, Anjo (JP); Tomonobu Nashimoto, Anjo (JP)

(73) Assignee: Makita Corporation, Anjo-Shi (JP)

( * ) Notice: Subject to any disclaimer, the term of this patent is extended or adjusted under 35 U.S.C. 154(b) by 102 days.

This patent is subject to a terminal disclaimer.

(21) Appl. No.: 13/034,231

(22) Filed: Feb. 24, 2011

(65) Prior Publication Data

US 2011/0214296 A1    Sep. 8, 2011

(30) Foreign Application Priority Data

Mar. 3, 2010    (JP) ................................ 2010-046693

(51) Int. Cl.
*B28D 1/04*    (2006.01)

(52) U.S. Cl.
USPC ......... 30/390; 30/291; 83/698.11; 83/698.41; 83/665

(58) Field of Classification Search
USPC ............... 30/390, 291, 388, 290; 123/195 E, 123/198 R–198 P, 195 C, 196 R; 83/291, 388, 83/698.11, 698.41, 665, 666, 698.31, 83/698.51; 451/357–359, 344, 538; 125/13.01, 13.02, 13.03; 409/232, 234
See application file for complete search history.

(56) References Cited

U.S. PATENT DOCUMENTS

| | | | |
|---|---|---|---|
| 2,693,789 A | 11/1954 | Lechtenberg | |
| 2,714,376 A | 8/1955 | Bakke et al. | |
| 4,345,353 A | 8/1982 | Sommerfeld | |
| 4,370,809 A | 2/1983 | Takahashi et al. | |
| 4,393,589 A * | 7/1983 | Barkhult | 30/381 |
| 4,545,121 A | 10/1985 | Armbruster et al. | |
| 4,693,735 A * | 9/1987 | Wehle | 55/385.1 |
| 5,177,871 A | 1/1993 | Martenson | |
| 5,233,750 A * | 8/1993 | Wolf et al. | 30/382 |
| 5,317,997 A * | 6/1994 | Tomitaku | 123/41.7 |
| 5,438,965 A * | 8/1995 | Aronsson et al. | 123/198 E |
| 5,540,210 A | 7/1996 | Jones | |

(Continued)

FOREIGN PATENT DOCUMENTS

| | | |
|---|---|---|
| DE | 94 10 988.5 U1 | 10/1994 |
| DE | 198 20 029 A1 | 11/1999 |

(Continued)

OTHER PUBLICATIONS

Nov. 15, 2012 Search Report issued in European Patent Application No. 12182448.6.

(Continued)

*Primary Examiner* — Omar Flores Sanchez
(74) *Attorney, Agent, or Firm* — Oliff PLC

(57) ABSTRACT

A handheld engine-driven cutter is provided with a disk blade and a four-stroke engine that drives the disk blade, a filter through which air provided to the four-stroke engine passes, a carburetor that mixes fuel and the air that passed through the filter, a casing that houses the filter and the carburetor, and a filter bracket intervened between the filter and the carburetor, which guides the air having passed the filter to the carburetor. An oil separator is formed integrally with the filter bracket that protrudes out toward the carburetor.

12 Claims, 17 Drawing Sheets

(56) References Cited

U.S. PATENT DOCUMENTS

| | | | |
|---|---|---|---|
| 5,595,153 A * | 1/1997 | Hoppner et al. | 123/198 E |
| 5,738,064 A | 4/1998 | Lowe et al. | |
| 6,050,253 A | 4/2000 | Nilsson et al. | |
| 6,232,672 B1 | 5/2001 | Leufen et al. | |
| 6,374,501 B1 | 4/2002 | Claesson | |
| 6,478,666 B1 | 11/2002 | Berger et al. | |
| 6,561,887 B2 | 5/2003 | Lai et al. | |
| 6,568,088 B1 | 5/2003 | Ende | |
| 6,715,212 B2 * | 4/2004 | Durr et al. | 30/383 |
| 6,736,126 B2 | 5/2004 | Schroer et al. | |
| 6,748,660 B2 | 6/2004 | Buser et al. | |
| 6,949,017 B2 | 9/2005 | Koschel et al. | |
| 7,144,311 B2 | 12/2006 | Jaensch | |
| 7,699,049 B2 | 4/2010 | Burke | |
| 8,141,543 B2 | 3/2012 | Inami et al. | |
| 8,146,574 B2 * | 4/2012 | Heckel et al. | 123/572 |
| 8,272,134 B2 | 9/2012 | Soika et al. | |
| 2002/0129502 A1 * | 9/2002 | Durr et al. | 30/381 |
| 2002/0189110 A1 * | 12/2002 | Durr et al. | 30/383 |
| 2005/0109307 A1 | 5/2005 | Kawamoto | |
| 2006/0174851 A1 | 8/2006 | Furuya | |
| 2006/0240753 A1 | 10/2006 | Ziegs | |
| 2007/0000134 A1 * | 1/2007 | Uhl et al. | 30/130 |
| 2007/0056575 A1 | 3/2007 | Machens et al. | |
| 2007/0199554 A1 | 8/2007 | Jakobsson et al. | |
| 2009/0007440 A1 | 1/2009 | Soika et al. | |
| 2009/0019710 A1 * | 1/2009 | Grossman et al. | 30/390 |
| 2009/0100689 A1 | 4/2009 | Shimokawa | |
| 2009/0236900 A1 | 9/2009 | Due et al. | |
| 2010/0251867 A1 | 10/2010 | Shao et al. | |
| 2010/0319671 A1 | 12/2010 | Ichihashi et al. | |
| 2012/0011730 A1 | 1/2012 | Nakamura et al. | |

FOREIGN PATENT DOCUMENTS

| | | |
|---|---|---|
| DE | 20 2004 007 538 U1 | 10/2004 |
| DE | 10 2005 043 118 A1 | 3/2007 |
| EP | 1 714 740 A1 | 10/2006 |
| EP | 2 011 992 A2 | 1/2009 |
| EP | 2363232 A1 | 9/2011 |
| GB | 2 401 909 A | 11/2004 |
| JP | U-56-140402 | 10/1981 |
| JP | A-57-27701 | 2/1982 |
| JP | A-62-153554 | 7/1987 |
| JP | U-63-130659 | 8/1988 |
| JP | U-1-101726 | 7/1989 |
| JP | A-9-300339 | 11/1997 |
| JP | U-3052653 | 9/1998 |
| JP | A-2003-334862 | 11/2003 |
| JP | A-2005-155615 | 6/2005 |
| JP | U-2007-176128 | 7/2007 |
| JP | A-2007-528792 | 10/2007 |
| JP | A-2009-299606 | 12/2009 |
| WO | WO 2005/056225 A1 | 6/2005 |

OTHER PUBLICATIONS

Oct. 22, 2012 Search Report issued in European Patent Application No. 12182441.1.
U.S. Appl. No. 13/034,296, filed Feb. 24, 2011 in the name of Sugiyama et al.
U.S. Appl. No. 13/034,248, filed Feb. 24, 2011 in the name of Sugiyama et al.
U.S. Appl. No. 13/033,956, filed Feb. 24, 2011 in the name of Okumi et al.
U.S. Appl. No. 13/033,999, filed Feb. 24, 2011 in the name of Kondo et al.
Jun. 6, 2012 Extended European Search Report issued in European Patent Application No. 11156596.6.
"Ducati998" Workshop Manual, No. 998, Jan. 1, 2002, pp. 1-3, XP007920601.
European Search Report issued in Application No. 11156584.2; Dated Jul. 13, 2011.
European Search Report issued in Application No. 11156555.2; Dated Jul. 7, 2011.
Jan. 22, 2013 Office Action issued in U.S. Appl. No. 13/034,296.
Jan. 22, 2013 Office Action issued in U.S. Appl. No. 13/033,956.
Feb. 25, 2013 Office Action issued in U.S. Appl. No. 13/034,248.
Jul. 31, 2013 Notice of Allowance issued in U.S. Appl. No. 13/033,956.
Oct. 2, 2013 Notice of Allowance issued in U.S. Appl. No. 13/034,296.
Oct. 29, 2013 Office Action issued in Japanese Patent Application No. 2010-046696 (with English-language translation).
Nov. 5, 2013 Office Action issued in Japanese Patent Application No. 2010-046692 (with English-language translation).
Nov. 5, 2013 Office Action issued in Japanese Patent Application No. 2010-046695 (with English-language translation).
Nov. 25, 2013 Office Action issued in U.S. Appl. No. 13/033,999.
Jun. 6, 2013 Office Action issued in U.S. Appl. No. 13/034,248.
Jul. 12, 2013 Office Action issued in U.S. Appl. No. 13/034,296.
Office Action issued in U.S. Appl. No. 13/034,248; mailed Jan. 6, 2014.

* cited by examiner

ENGINE-DRIVEN CUTTER

CROSS-REFERENCE TO RELATED ED APPLICATION

This application claims priority to Japanese Patent Application No. 2010-46693 filed on Mar. 3, 2010, the contents of which are hereby incorporated by reference into the present application.

TECHNICAL FIELD

The present invention relates to a handheld engine-driven cutter that drives a disk blade by an engine.

DESCRIPTION OF RELATED ART

Japanese Patent Application Publication No. 2007-528792 discloses a handheld engine-driven cutter. The engine-driven cutter comprises a disk blade and an engine that drives the disk blade, and, for example, is used for cuffing concrete and steel materials at a building site. A two-stroke engine is used as the foregoing engine. The two-stroke engine is advantageous over other types of engines in that the structure is simple and the size is small. Thus, the two-stroke engine is used in the handheld engine-driven cutter for downsizing and cost reduction.

Nevertheless, the two-stroke engine has a problem in that its emission of unburned gas is high, and its adverse effect on the natural environment is relatively great. Demands for environmental performance are also increasing with handheld engine-driven cutters, and it is difficult for the conventional products adopting the two-stroke engine to satisfy the high level of environmental performance that is being demanded.

BRIEF SUMMARY OF INVENTION

In light of the foregoing circumstances, a use of a four-stroke engine in substitute for the two-stroke engine in a handheld engine-driven cutter may be considered. With the four-stroke engine, since its intake port and exhaust port are respectively opened and closed with a valve operating mechanism, there is an advantage in that the emission of unburned gas is low and it is energy-efficient in comparison to the two-stroke engine in which the ports are respectively opened and closed with a piston.

Nevertheless, with the four-stroke engine that mainly uses separate lubrication, unlike the two-stroke engine that mainly uses mixed lubrication, it is necessary to provide a breathing tube and an oil separator for eliminating blow-by gas that leaks into a locker cover. Thus, when the four-stroke engine is used in the engine-driven cutter, a new problem arises in that the structure becomes complicated and the manufacturing process becomes complicated pursuant to the addition of the breathing tube and the oil separator.

Accordingly, an object of this invention is to realize an engine-driven cutter mounted with a four-stroke engine without complicating the structure and the assembly process.

In order to achieve the foregoing object, with a handheld engine-driven cutter, preferably, the oil separator is integrally formed with the filter bracket. Moreover, preferably, the oil separator protrudes out from the filter bracket towards the carburetor.

With this engine-driven cutter, since the oil separator is formed integrally with the filter bracket, the structure is simple and the manufacture is easy. Moreover, the oil separator protrudes out from the filter bracket towards the carburetor. Generally speaking, since a carburetor is smaller than a filter, there is a larger space on the carburetor side of the filter bracket than on the filter side. Accordingly, if the structure is such that the oil separator protrudes out toward the carburetor, and oil separator can be effectively disposed in the unused space.

DETAILED DESCRIPTION OF INVENTION

Figure 1:
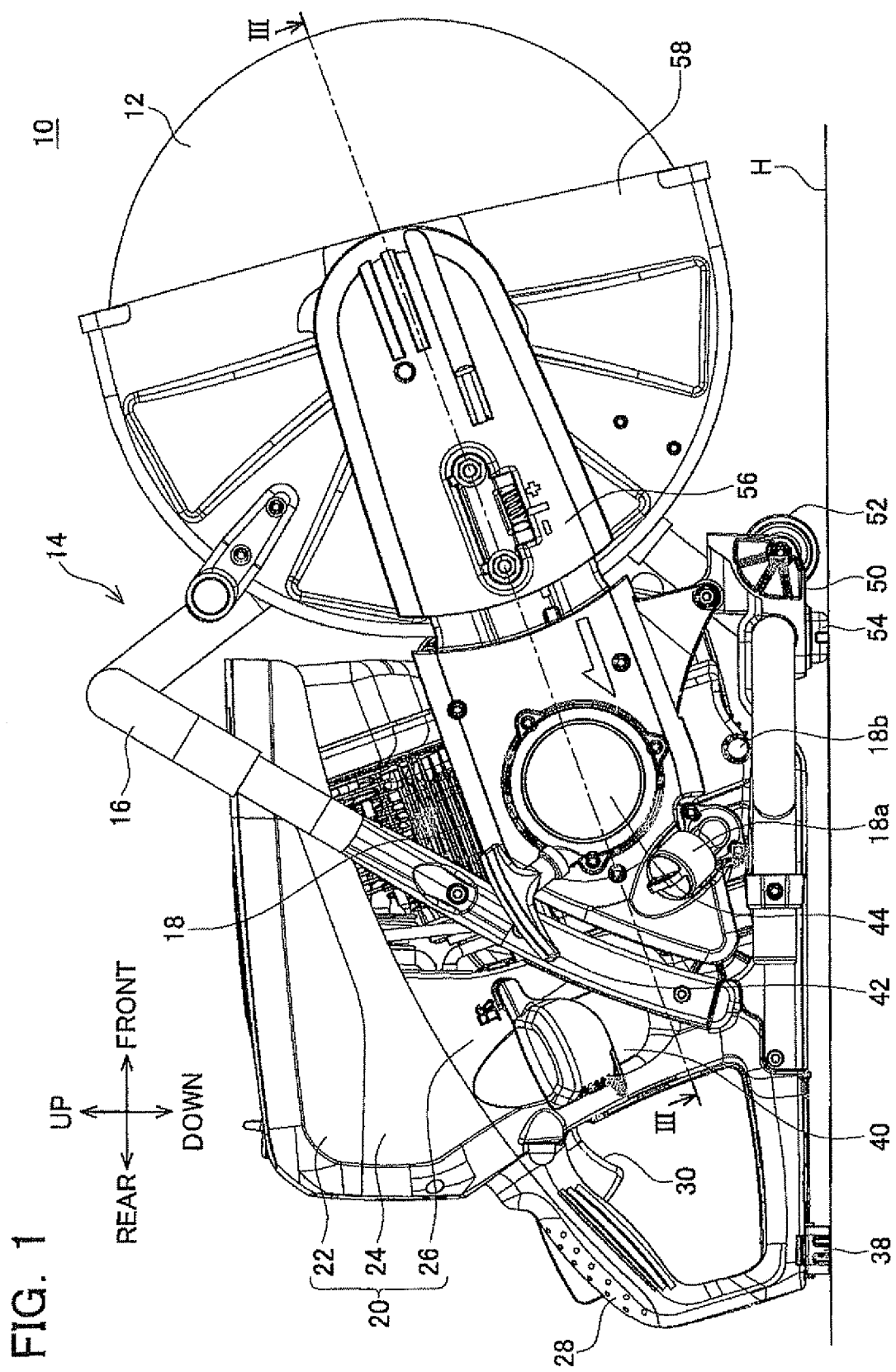
FIG. 1 shows a view of an engine-driven cutter from a right side (driving side).

In one aspect of the present teachings, a handheld engine-driven cutter preferably comprises a disk blade, a four-stroke engine that drives the disk blade, a filter through which air provided to the four-stroke engine passes, a carburetor that mixes fuel and the air that passed through the filter, a casing that houses the filter and the carburetor, and a filter bracket intervened between the fitter and the carburetor. The filter bracket guides the air having passed the filter to the carburetor. Moreover, preferably, the filter bracket is fanned integrally with an oil separator that protrudes out toward the carburetor.

According to the foregoing structure, the oil separator can be disposed efficiently, and it is thereby possible to prevent the complication and enlargement of the structure, and the complication of the manufacturing process.

In one embodiment of the present teachings, preferably, the casing includes a carburetor mount to which the filter bracket is connected with the carburetor intervening therebetween, the carburetor mount composing a part of an outer wall of the casing, and a seal member that is made of polymer material and includes a through hole is arranged around a periphery of the carburetor mount. In the foregoing case, preferably, a breathing tube extending from the four-stroke engine is connected with the through hole of the seal member directly or via a joint from an outer side of the casing, and a nipple portion formed on the oil separator is connected with the through hole of the seal member from an inner side of the casing.

According to the foregoing structure, the process of connecting the breathing tube to the oil separate within the casing is not required upon assembling the engine-driven cutter. Specifically, when the filter bracket is assembled to the carburetor mount with the carburetor interposed therebetween, the nipple portion of the oil separator is automatically connected to the through hole of the seal member from the inside of the casing. Subsequently, as a result of connecting the breathing tube to the through hole of the seal member from the outside of the casing, the oil separator and the breathing tube can be easily connected.

When the carburetor is assembled to the carburetor mount, there may be cases where an arm or the like to open and close the throttle valve of the carburetor makes contact with the carburetor mount. In the foregoing case, preferably, the carburetor mount includes a recess portion at a range to face the arm or the like. It is thereby possible to prevent the arm or the like from making contact with the carburetor mount. Note that this recess portion may also be provided similarly to other portions of the carburetor, in addition to the arm that opens and closes the throttle valve, which may make contact with the carburetor mount.

In one embodiment of the present teachings, preferably, the carburetor mount includes a supporting beam portion protruding towards the carburetor, and the supporting beam portion holds the carburetor at an assembly position upon connecting the filter bracket to the carburetor mount with the carburetor intervening therebetween. According to this structure, the carburetor mount and the carburetor and the filter bracket can be easily assembled upon assembling the engine-driven cutter.

In one embodiment of the present teachings, preferably, a hose nipple (also known as a tube nipple) in which at least a distal end thereof extends towards the filter bracket is arranged on an air vent of the carburetor, and the filter bracket includes an air vent connecting opening into which the hose nipple is inserted.

According to the foregoing structure, the processing of connecting a hose (or tube) to the hose nipple of the air vent is not required upon assembling the engine-driven cutter. Specifically, if the filter bracket is assembled to the carburetor mount with the carburetor interposed therebetween, the hose nipple of the air vent is automatically inserted into the air vent connecting opening of the filter bracket.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved engine-driven cutters.

Moreover, combinations of features and steps disclosed in the following detail description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENT

Figure 2:
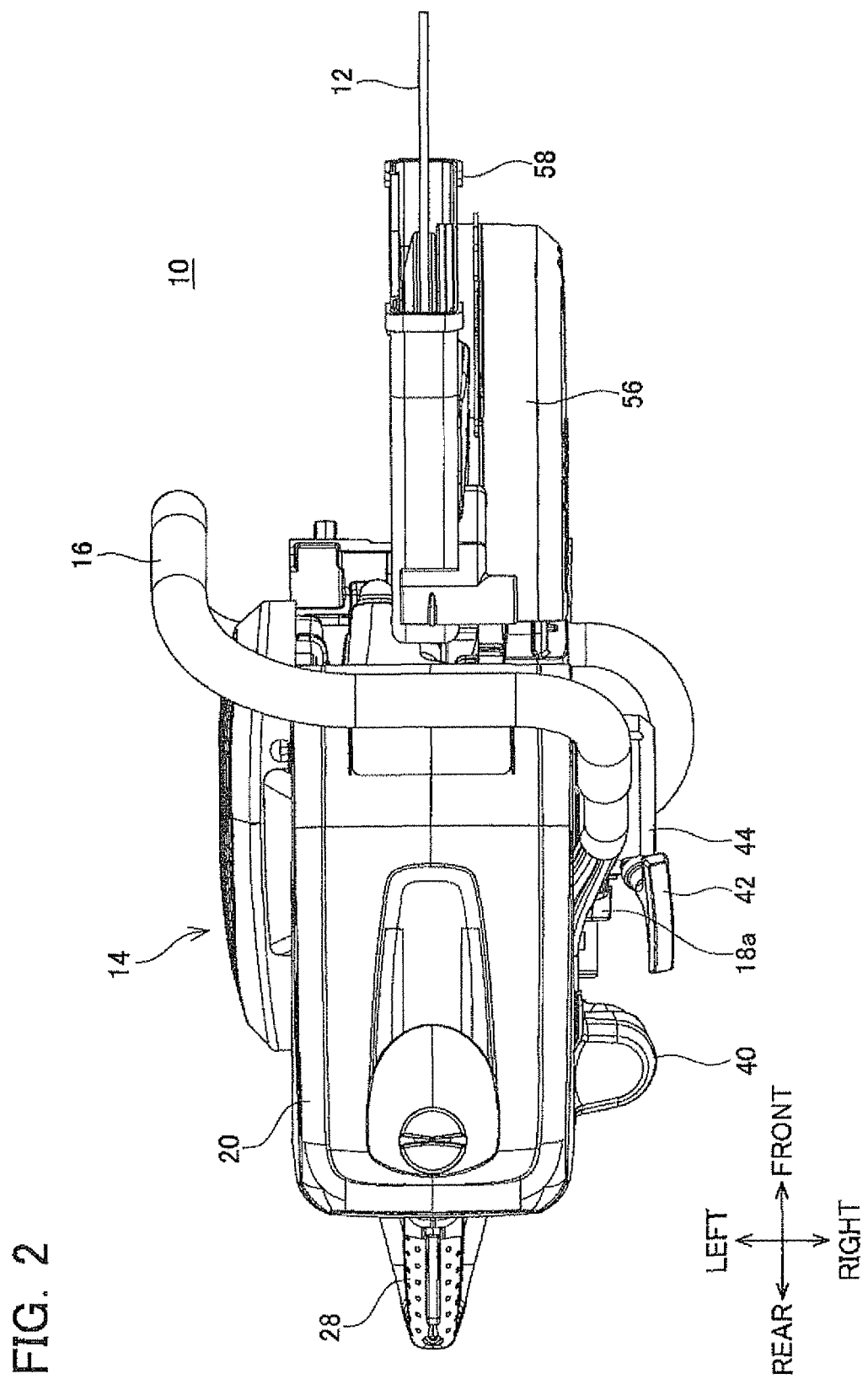
FIG. 2 shows a plan view of the engine-driven cutter from above.
Figure 3:
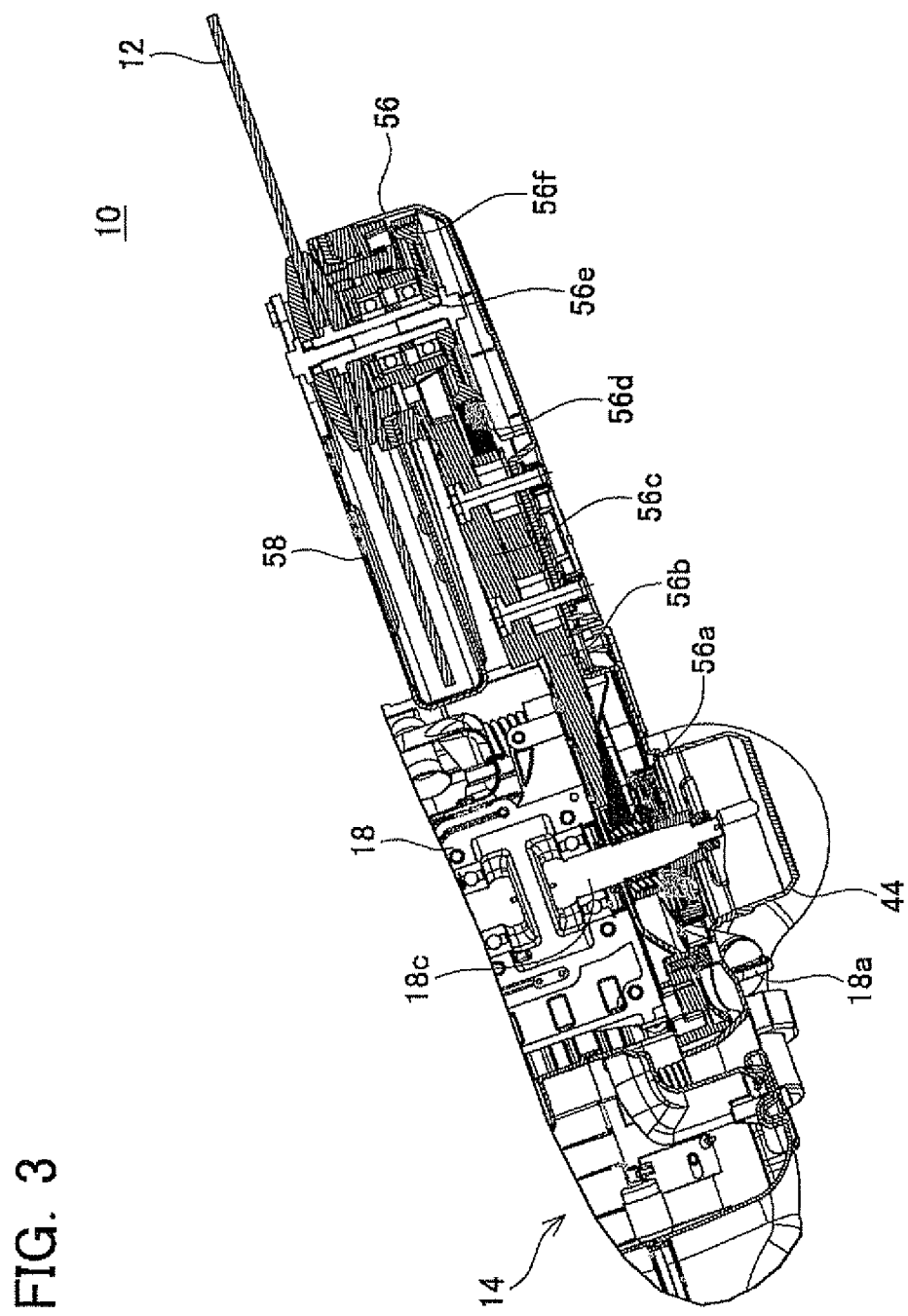
FIG. 3 is a cross sectional view of line in FIG. 1.

Examples of an engine-driven cutter are explained below with reference to the appended drawings. FIG. 1 is a side view of an engine-driven cutter 10, and FIG. 2 is a plan view of the engine-driven cutter 10. Moreover, FIG. 3 is a cross sectional view of line III-III in FIG. 1. The engine-driven cutter 10 comprises a disk blade 12, and a main body 14 that drives the disk blade 12. The disk blade 12 can cut lithic materials and metal materials, and the engine-driven cutter 10 is used e.g. for cutting concrete and steel materials at a building site.

As shown in FIG. 1 and FIG. 2, when the engine-driven cutter 10 is mounted on a horizontal plane H, the disk blade 12 is positioned on one side of the horizontal direction relative to the main body 14. In the ensuing explanation, a state where the engine-driven cutter 10 is mounted on the horizontal plane H is used as the reference, and one side of the horizontal direction where the disk blade 12 is positioned relative to the main body 14 is referred to as a front side, and the opposite direction thereof is referred to as a rear side. Moreover, the vertical upward direction is simply referred to as an upper side and the vertical downward direction is simply referred to as a lower side. In addition, as shown in FIG. 2, one side of the horizontal direction that is perpendicular to the front-back direction is referred to as a left side and the other side of the horizontal direction perpendicular to the front-back direction is referred to as a right side. For example, the disk blade 12 is positioned in front of the main body 14, and its rotating axis extends in the left-right direction and perpendicular to the horizontal plane H at the upper side of the horizontal plane H.

The main body 14 is provided with a front handle 16 and a rear grip 28. The front handle 16 is formed with a pipe material, and, in addition to being a handle to be grasped by the user, it also functions as a frame for ensuring the strength of the main body 14. The front handle 16 extends from the upper side to the left side of the main body 14 at the front part of the main body 14. The rear grip 28 is provided in the lower rear part of the main body 14. The rear grip 28 extends in a loop shape from the main body 14. The rear grip 28 is provided with an operation switch such as a throttle lever 30. Moreover, the lower part of the rear grip 28 is provided with a rear foot part 38.

Normally, the user grasps the front handle 16 with one's left band, and grasps the rear grip 28 with one's right hand to hold the engine-driven cutter 10. The user moves the engine-driven cutter 10 relative to the workpiece and cuts the workpiece with the disk blade 12. As described above, the engine-driven cutter 10 of this embodiment is a handheld engine-driven cutter that is held by the user. Here, when the user holds the engine-driven cutter 10 as described above, the user is positioned on the left side of the main body 14. Normally, since the user is positioned on the left side of the engine-driven cutter 10, the left side of the engine-driven cutter 10 is also referred to as the user side.

The main body 14 comprises an engine 18 that drives the disk blade 12. The engine 18 is a four-stroke reciprocating engine. With the four-stroke engine, since an intake port and an exhaust port are respectively opened and closed with a valve operating mechanism, there is an advantage in that the emission of unburned gas is low and it is energy-efficient (low fuel consumption) in comparison to a two-stroke engine in which such ports are opened and closed respectively with a piston. Since the engine-driven cutter 10 adopts the four-stroke engine 18, its environmental performance is considerably improved.

Since the engine 18 is a separate lubrication system four-stroke engine, unlike a mixed lubrication-type two-stroke engine. The engine oil needs to be supplied separately from the fuel. Moreover, the engine oil needs to be replenished and replaced at an adequate frequency. Thus, the engine 18 is provided with an oil supplying opening 18a to which the engine oil is fed, and an oil exhausting opening 18b for exhausting the engine oil.

Note that the engine 18 is not limited to the separate lubrication system four-stroke engine, and it may also be a mixed lubrication system four-stroke engine. However, the separate lubrication system four-stroke engine has an advantage in that it yields superior environmental performance in comparison to the mixed lubrication system four-stroke engine, since a large amount of engine oil is subject to cyclic use in the engine, and the amount of engine oil that is consumed together with the fuel is extremely small. Moreover, running costs to be borne by a user can also be reduced since the consumption of the engine oil is reduced. Furthermore, if the mixed lubrication system four-stroke engine is employed in a case where the engine-driven cutter 10 is not used for a long period of time, the fuel in the carburetor will evaporate causing only the engine oil to remain therein, and the carburetor may become clogged. With respect to this point, by adopting the separate lubrication system four-stroke engine, the effect of being able to avoid this kind of problem can also be expected.

The main body 14 comprises a cutter arm 56 mounted on the disk blade 12. The cutter arm 56 is provided on the right side of the main body 14, and extends toward the front side of the main body 14. As shown in FIG. 3, the cutter arm 56 comprises a first plate 56b fixed to the engine 18 and a second plate 56c fixed to the first plate 56b, and the second plate 56c is provided with a tool shaft 56e for rotatably supporting the disk blade 12.

Moreover, the cutter arm 56 comprises a drive pulley 56a fixed to the driving axis (crank shaft) 18c of the engine 18, a driven pulley 56f fixed to the tool shaft 56; and a transmission belt 56d placed across the drive pulley 56a and the driven pulley 56f. Consequently, torque output by the engine 18 is transmitted to the tool shaft 56; and the disk blade 12 is rotatably driven by the engine 18. Accordingly, the cutter arm 56 is also a transmission mechanism for transmitting the torque output by the engine 18 to the disk blade 12. The right side of the main body 14 to which the cutter arm 56 as the transmission mechanism is provided is generally referred to as the driving side. Here, the position for mutually fixing the first plate 56b and the second plate 56c is adjustable, and the tension of the transmission belt 56d can be adjusted. Note that the driving axis 18c of the engine 18 and the tool shaft 56e are mutually parallel, and they both extend in the left-right direction. Moreover, the cutter arm 56 is provided with a disk blade cover 58 for covering the disk blade 12.

The main body 14 comprises a recoil starter 44 for the user to start the engine 18. The recoil starter 44 is provided on the right side of the main body 14, and provided above the cutter arm 56. As shown in FIG. 3, the driving axis 18c of the engine 18 extends by passing through the drive pulley 56a, and the recoil starter 44 is connected to the distal end of the driving axis 18c. The recoil starter 44 is provided with a starter lever 42 to be operated by the user. When the user pulls the starter lever 42, the driving axis 18c of the engine 18 rotates and the engine 18 is started.

The main body 14 comprises a guard 50. The guard 50 is provided on the lower front side of the main body 14. The lower front side of the main body 14 is a position where chips of a workpiece scatter from the disk blade 12, and the guard 50 repels the scattered chips of the workpiece toward the lower side of the main body 14. Consequently, the chips of the workpiece that collide with the main body 14 are prevented from being repelled toward the user. Moreover, the guard 50 is provided with a pair of rollers 52 and a front leg portion 54. The pair of rollers 52 are positioned more toward the front side than the front leg portion 54. When the user raises the rear grip 28 to the upper side, the pair of rollers 52 contact the surface of the workpiece and become a fulcrum for angling the engine-driven cutter 10 towards the workpiece. Note that the structure of the guard 50 is explained in detail later.

The main body 14 comprises a casing 20. The casing 20 is formed from a resin material. The casing 20 comprises a casing main body 26, a filter cover 24, and a top cover 22. The top cover 22 is fixed to the filter cover 24, and the filter cover 24 is fixed to the casing main body 26. A part of the casing main body 26 is a fuel tank for storing the fuel of the engine 18, and is provided with a fuel supplying opening 40 for supplying the fuel. Moreover, the casing main body 26 is integrally formed with the rear grip 28 described above, and the internal space of the rear grip 28 also constitutes a part of the fuel tank.

Figure 4:
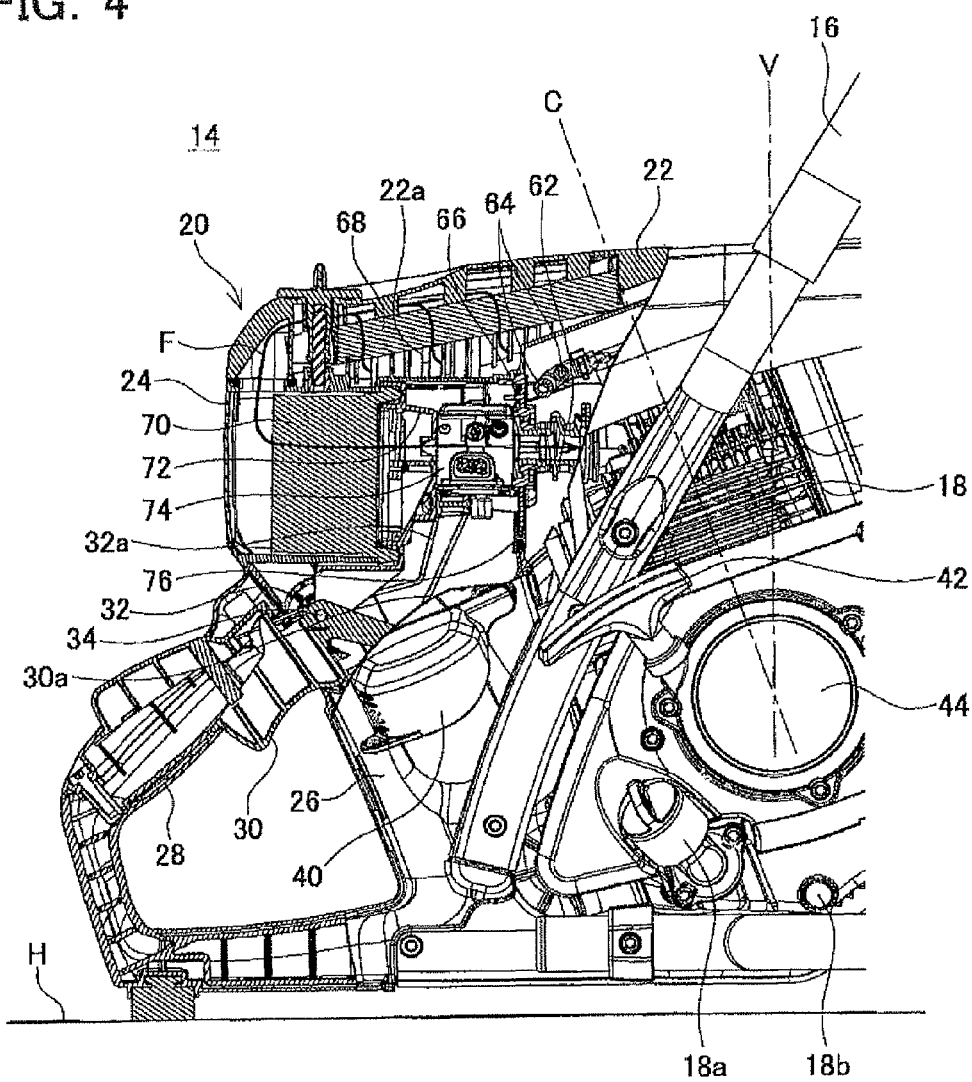
FIG. 4 is a partial cross sectional view of a main body of the engine-driven cutter.

FIG. 4 shows the right side of the main body 14. Note that, in FIG. 4, a part thereof is a cross section, and the structure inside the casing 20 is shown. As shown in FIG. 4, with the engine-driven cutter 10, the oil supplying opening 18a and the oil exhausting opening 18b are both provided on the right side of the main body 14. As described above, if the oil supplying opening 18a and the oil exhausting opening 18b are both provided on the same side of the main body 14, the user can replace the engine oil without having to change the direction of the engine-driven cutter 10 or change one's position relative to the engine-driven cutter 10. Moreover, since the oil supplying opening 18a and the oil exhausting opening 18b can be visually confirmed simultaneously, it is possible to prevent a mistake such as continuing to supply the engine oil from the oil supplying opening 18a while forgetting to close the oil exhausting opening 18b. In addition, since the oil supplying opening 18a and the oil exhausting opening 18b are disposed on the right side (driving side) of the main body 14, the oil supplying opening 18a and the oil exhausting opening 18b will not get in the way of the user positioned on the opposite left side (user side).

In addition to the above, with the engine-driven cutter 10, the recoil starter 44, the starter lever 42, and the fuel supplying opening 40 are also provided on the right side (driving side) of the main body 14. Accordingly, existence of the recoil starter 44, the starter lever 42, and the fuel supplying opening 40 will not get in the way of the user positioned on the opposite left side (user side). Accordingly, with the engine-driven cutter 10 of this embodiment, the oil supplying opening 18a, the oil exhausting opening 18b, the recoil starter 44, the starter lever 42, and the fuel supplying opening 40 are all provided on the right side (driving side) of the main body 14 where the cutter arm 56 is positioned. Accordingly, as shown in FIG. 2, a large concavo-convex does not exist on the left side (user side) of the main body 14 in comparison to the right side (driving side) of the main body 14. Consequently, the user can comfortably perform operations without having to mind the concavo-convex of the main body 14.

The internal structure of the casing 20 is now explained. As shown in FIG. 4, a flow path shown with arrow F in FIG. 4 is formed in the casing 20, and the structure is such that the air introduced from the intake window 22a of the top cover 22 passes through the casing 20 and is supplied to the engine 18 via an intake connecting tube 62. The casing 20 is internally provided with a pre-filter 68, a main filter 70, and a carburetor 74 along the foregoing flow path F. The pre-filter 68 is positioned between the top cover 22 and the filter cover 24, and the main filter 70 is positioned between the filter cover 24 and the casing main body 26. Thus, the pre-filter 68 is positioned at the upper side of the main filter 70 in a state where the engine-driven cutter 10 is mounted on the horizontal plane H. The air introduced from the intake window 22a passes through the pre-filter 68 and the main filter 70 in that order, and the dust contained therein is removed (or filtered). Here, after the air passes through from the lower side to the upper side of the pre-filter 68, it flows along the inner surface of the top cover 22 and the filter cover 24, and passes through the main filter 70 after changing its direction of flow approximately 270 degrees.

The air that passed through the main filter 70 subsequently passes through the carburetor 74. The carburetor 74 mixes the air that passed through the main filter 70 with the fuel. The carburetor 74 is a general-purpose carburetor, and includes a throttle valve, a check valve, an air vent and the like. The air that was mixed with the fuel in the carburetor 74 (so-called air-fuel mixture) passes through the intake connecting tube 62 is supplied to the engine 18. Note that the intake connecting tube 62 is positioned outside of the casing 20. Moreover, FIG. 4 shows the breathing tube 64 at the upper side of the intake connecting tube 62. The breathing tube 64 extends from the engine 18, and is connected to an oil separator 82 described later. Note that the breathing tube 64 is a pipeline for eliminating blow-by gas discharged inside the locker cover within the engine 18, and is connected to a circulatory path of the engine oil including a crank casing within the engine 18.

The engine-driven cutter 10 of this embodiment adopts the four-stroke engine 18. With the four-stroke engine, the intake port is provided in the cylinder head, and the carburetor 74 connected to the intake port is positioned relatively on the upper side. Thus, if the main filter 70 is positioned at the upper side of the carburetor 74, the main filter 70 will protrude considerably toward the upper side relative to the engine 18, and the height of the engine-driven cutter 10 is increased. Thus, with the engine-driven cutter 10 of this embodiment, as shown in FIG. 4, the main filter 70 and the carburetor 74 are arranged to align on a straight line along the direction of flow of the air passing through the main filter 70 and the carburetor 74. Specifically, the carburetor 74 is positioned at the rear side of the engine 18 and the main filter 70 is positioned at the rear side of the carburetor 74. According to this kind of arrangement and structure, even if the four-stroke engine 18 is adopted, the height of the engine-driven cutter 10 can be kept relatively small.

As shown in FIG. 4, with the engine-driven cutter 10 of this embodiment, a relatively large main filter 70 is adopted, and a part of the main filter 70 is protruding toward the upper side of the rear grip 28. Consequently, the rear surface of the casing 20 (portion of the filter cover 24) is also protruding in a convex shape at the upper side of the rear grip 28. Accordingly, if a part or the entirety of the main filter 70 is disposed to protrude up reaching the upper side of the rear grip 28, a large main filter 70 can be mounted. As a result of mounting the large main filter 70, the main filter 70 does not clog easily, and the user needs to clean the main filter 70 less frequently. Note that even if the rear surface of the casing 20 protrudes in the convex shape at the upper side of the rear grip 28, it will not interfere with the user's hand that will grasp the rear grip 28. If such interference becomes a problem, the angle of the rear grip 28 may be adjusted.

Note that, with the conventional engine-driven cutter, the two-stroke engine is adopted. With the two-stroke engine, the intake port is provided in the cylinder block and the carburetor connected to the intake port is positioned relatively low. Consequently, with the conventional engine-driven cutter, the main filter 70 is disposed at the upper side of the carburetor 74, and the downsizing of the engine-driven cutter is thereby being sought (for example, refer to Japanese Patent Application Publication No 2007-528792).

As shown in FIG. 4, with the engine-driven cutter 10, when the engine-driven cutter 10 is mounted on the horizontal plane H, the design is such that a central axis C of the cylinder of the engine 18 is angled towards the carburetor 74 relative to a vertical direction V. If the engine 18 is disposed as described above, the carburetor 74 and the main filter 70 connected to the engine 18 can be positioned even lower. Consequently, the height of the engine-driven cutter 10 can be reduced. In addition, since the four-stroke engine includes a valve operating mechanism above the cylinder head and the oil pan below the crank casing, its height is relatively great in comparison to the two-stroke engine, and there is a possibility that this may cause the enlargement of the engine-driven cutter 10. With respect to this point also, if the engine 18 is angled and positioned as described above, the engine-driven cutter 10 can be designed to be compact.

Figure 5:
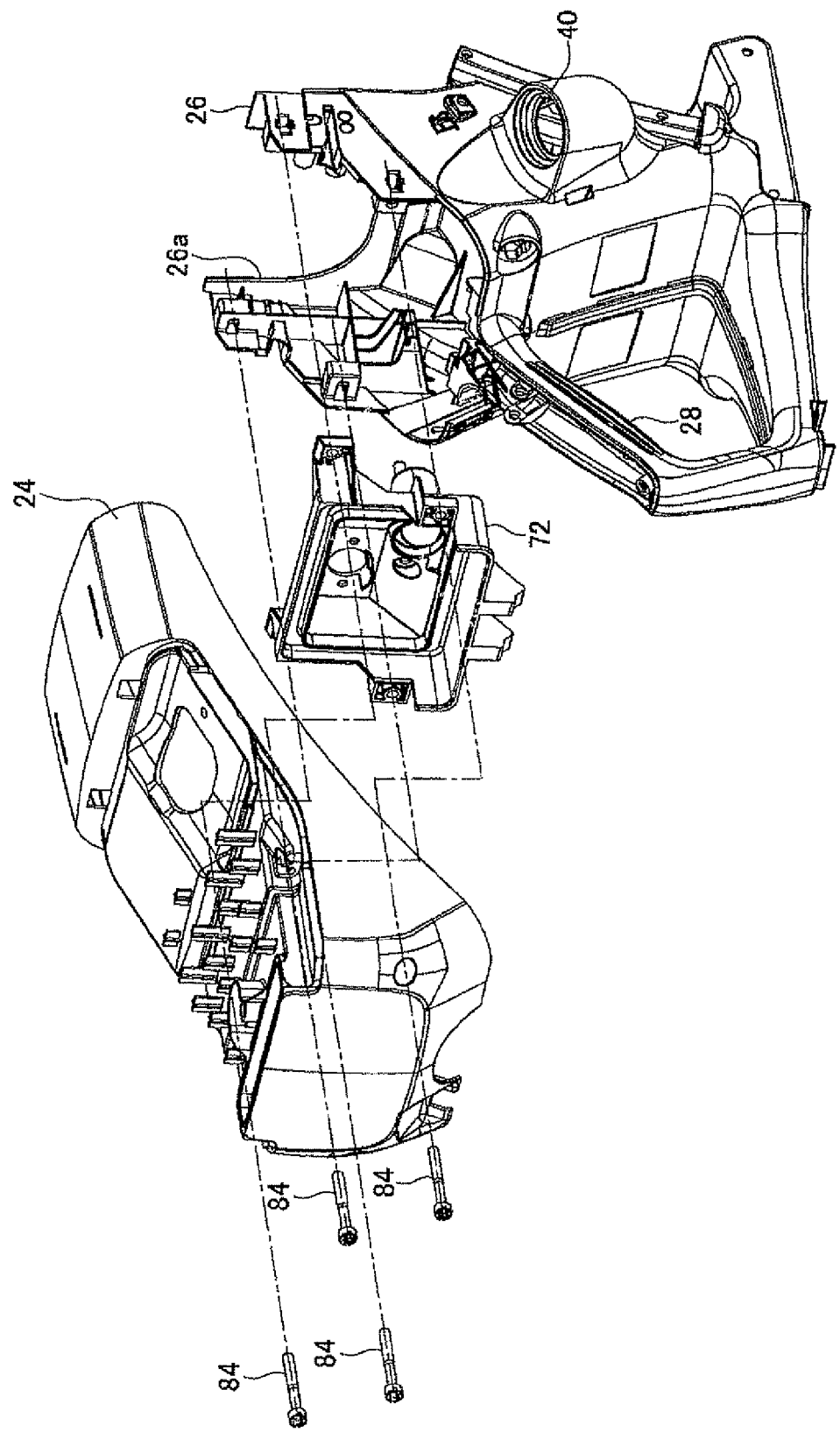
FIG. 5 shows an assembly structure of a casing main body and a filter bracket and a filter cover.

As shown in FIG. 4 and FIG. 5, a filter bracket 72 is provided between the main filter 70 and the carburetor 74. The filter bracket 72 guides the air that passed through the main filter 70 to the carburetor 74. The filter bracket 72 is fixed to the casing main body 26, and retains the main filter 70 at a fixed position.

Figure 6:
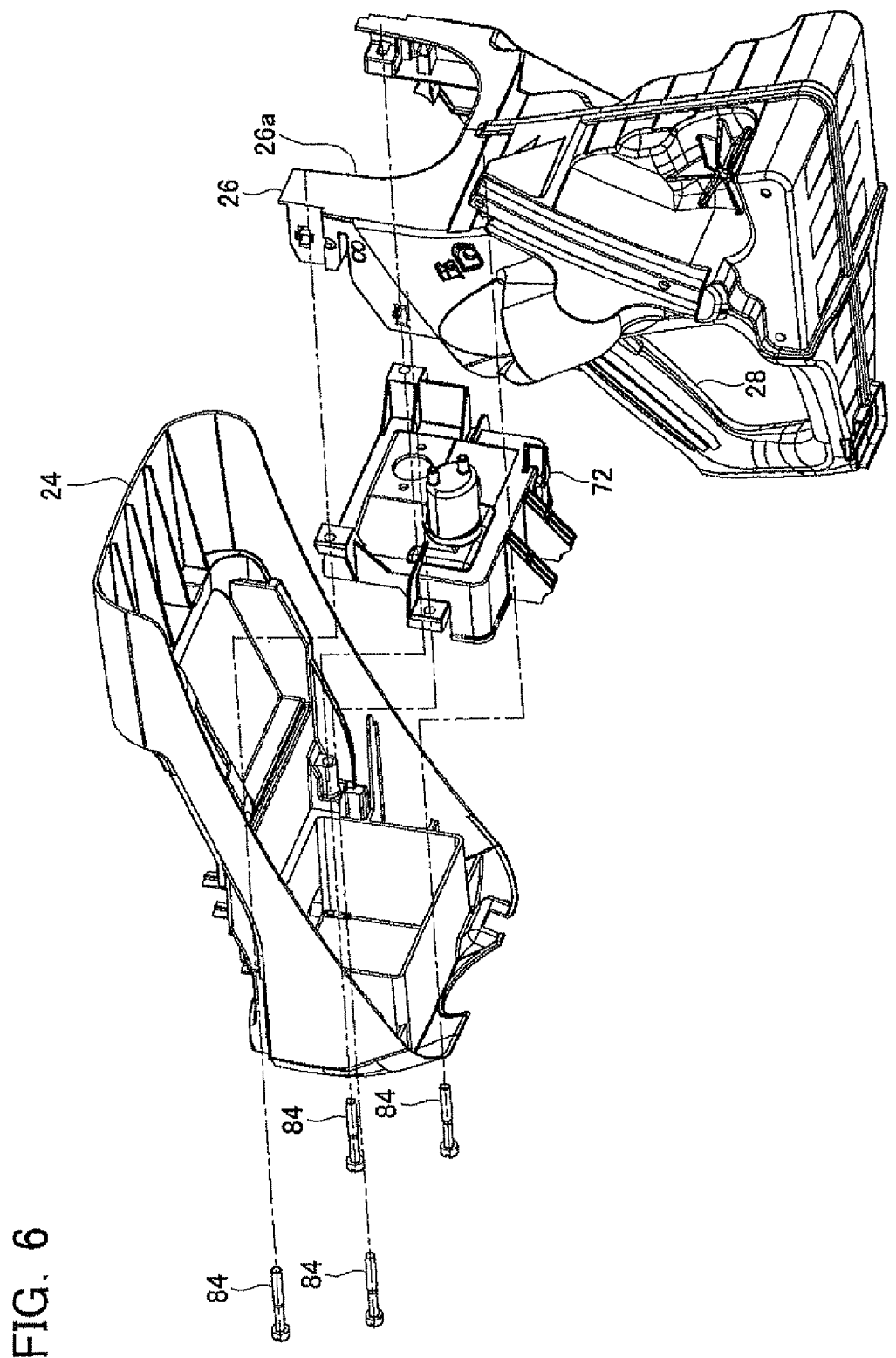
FIG. 6 is another view of the assembly structure of the casing main body and the filter bracket and the filter cover from a different direction from that of FIG. 5.

As shown in FIG. 5 and FIG. 6, the filter bracket 72 is fixed to the casing main body 26 together with the filter cover 24 with a mutual bolt 84. According to this structure, it is possible to simplify the structure and reduce the number of components in comparison to the structure where the filter bracket 72 and the filter cover 24 are separately fixed, and the further downsizing of the engine-driven cutter 10 can be sought. In addition, the assembly process of the engine-driven cutter 10 can be simplified. Note that, although not shown in FIG. 4 and FIG. 5, as described later, the carburetor 74, the carburetor mount 66, the intake connecting tube 62 and the like are assembled to the filter bracket 72 in advance. Moreover, a main filter 70 is disposed between the filter cover 24 and the filter bracket 72 upon the assembly thereof.

As shown in FIG. 4, the casing 20 includes a carburetor mount 66 to which the carburetor 74 is fixed. The carburetor mount 66 is mounted on a notch portion 26a of the casing main body 26 shown in FIG. 4 and FIG. 5, and configures a part of the outer wall of the casing 20. The carburetor mount 66 is mounted on the casing main body 26 via a seal member 76. The seal member 76 is an elastic member formed with a material with elasticity. In this embodiment, as one example, the seal member 76 is formed with a polymer material (more specifically a rubber material). The carburetor mount 66 can be displaced relative to the casing main body 26 based on the deformation of the seal member 76.

Figure 7:
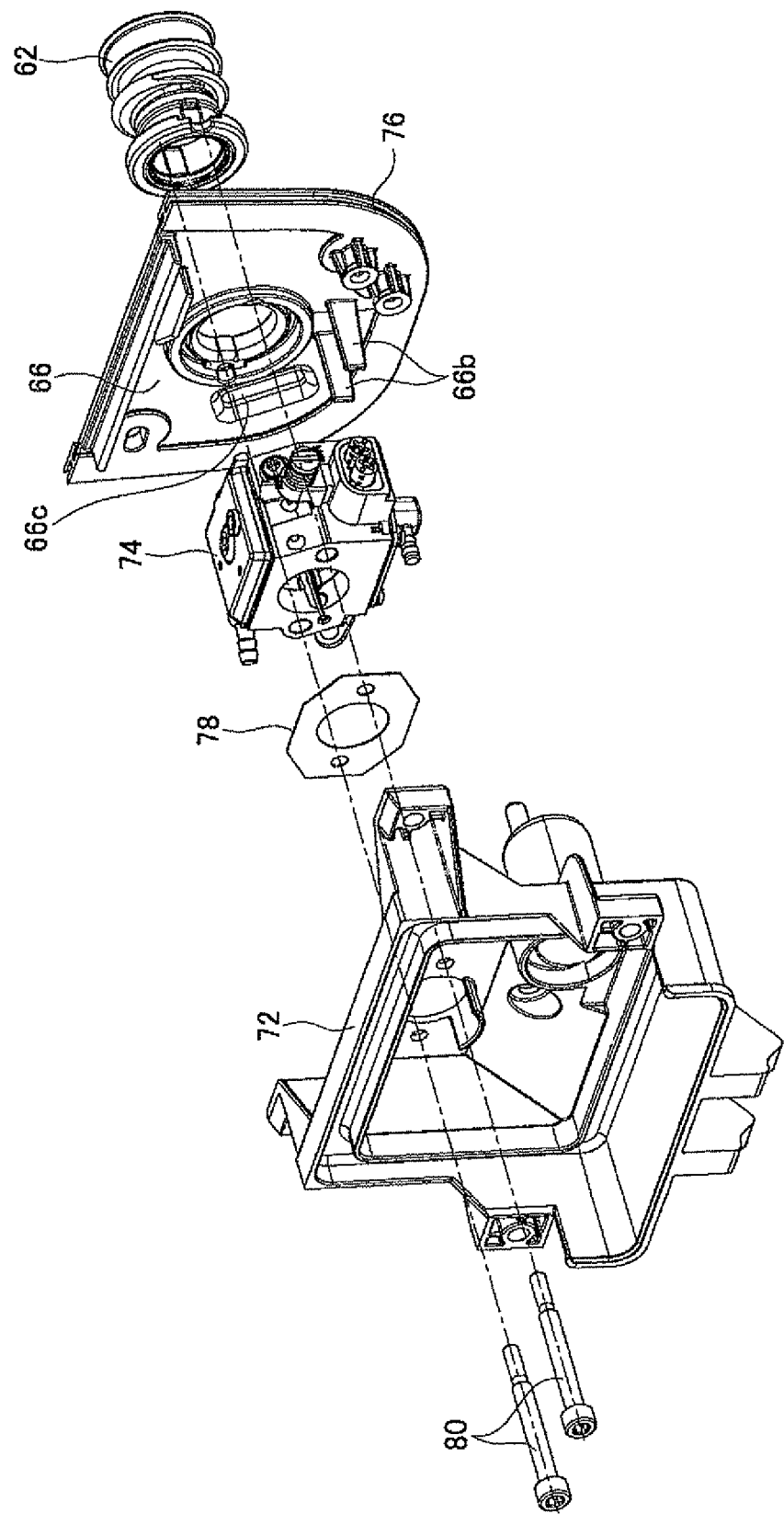
FIG. 7 shows an assembly structure of a filter bracket and a carburetor and a carburetor mount.

FIG. 7 shows a group of components that is assembled to the carburetor mount 66. As shown in FIG. 7, the filter bracket 72 and the intake connecting tube 62 are assembled to the carburetor mount 66 in addition to the carburetor 74. Here, the filter bracket 72 and the carburetor 74 and the carburetor mount 66 and the intake connecting tube 62 are mutually assembled with a mutual bolt 80. Note that a gasket 78 is disposed between the filter bracket 72 and the carburetor 74 upon assembling the foregoing group of components, and a seal member 76 is disposed at the peripheral edge of the carburetor mount 66.

As shown in FIG. 7, the carburetor mount 66 includes two supporting beam portions 66b protruding toward the carburetor 74. The supporting beam portions 66b support the carburetor 74 from the bottom and retain the carburetor 74 at the assembly position upon assembling the filter bracket 72 to the carburetor mount 66 with the carburetor 74 interposed therebetween. As a result of the supporting beam portion 66b retaining the carburetor 74, the operator to perform such assembly can easily perform the assembly process without having to support the carburetor 74 with one's hand.

Figure 8:
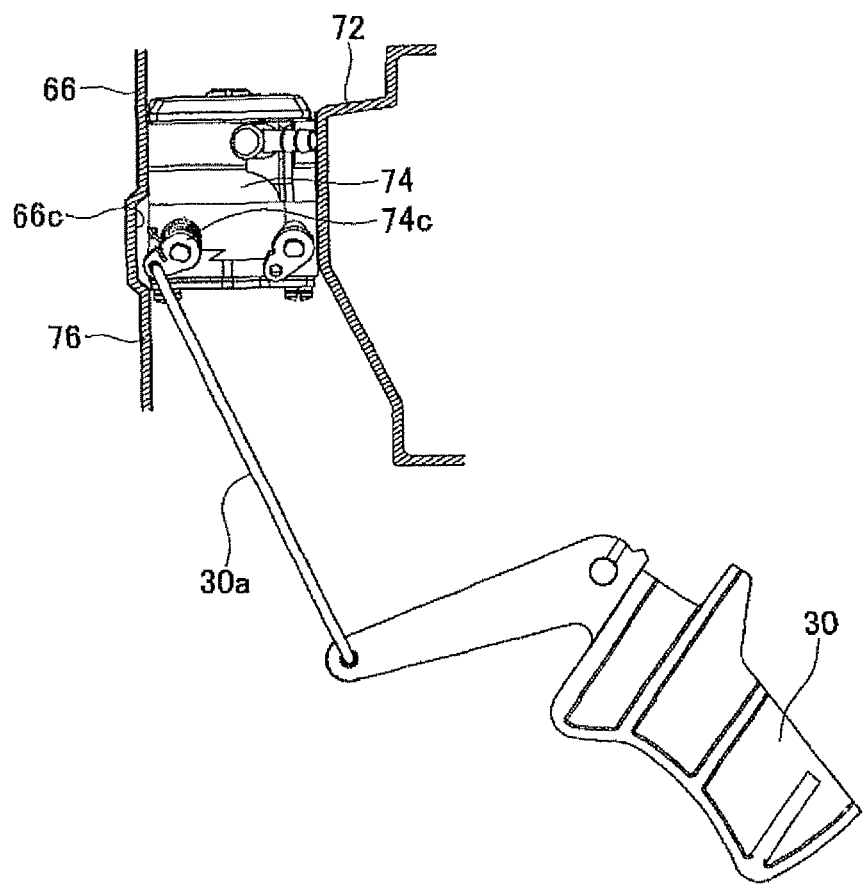
FIG. 8 shows a positional relationship of a carburetor arm and a recess portion of the carburetor mount.

As shown in FIG. 7, the carburetor mount 66 is formed with a recess portion 66c. The recess portion 66c is formed on a surface that is positioned on the side of the carburetor 74. As shown in FIG. 8, the recess portion 66c faces the arm 74c that opens and closes the throttle valve of the carburetor 74, and prevents the arm 74c from contacting the carburetor mount 66. As described above, as a result of forming the recess portion 66c in a range facing the arm 74c, the space between the carburetor mount 66 and the filter bracket 72 can be designed to be narrow, and the downsizing of the engine-driven cutter 10 can thereby be sought.

The filter bracket 72 is fixed to the carburetor mount 66 with the carburetor 74 interposed therebetween as shown in FIG. 7, and thereafter fixed to the casing main body 26 as shown in FIG. 5 and FIG. 6. Here, the carburetor mount 66 is mounted on the notch portion 26a of the casing main body 26 via the seal member 76. Accordingly, even if there is a dimension error in the filter bracket 72, the casing main body 26, and the carburetor mount 66, the filter bracket 72 can be properly fixed to the casing main body 26 by the carburetor mount 66 subordinately displacing in accordance with the casing main body 26 to compensate for the dimension error.

Figure 9:
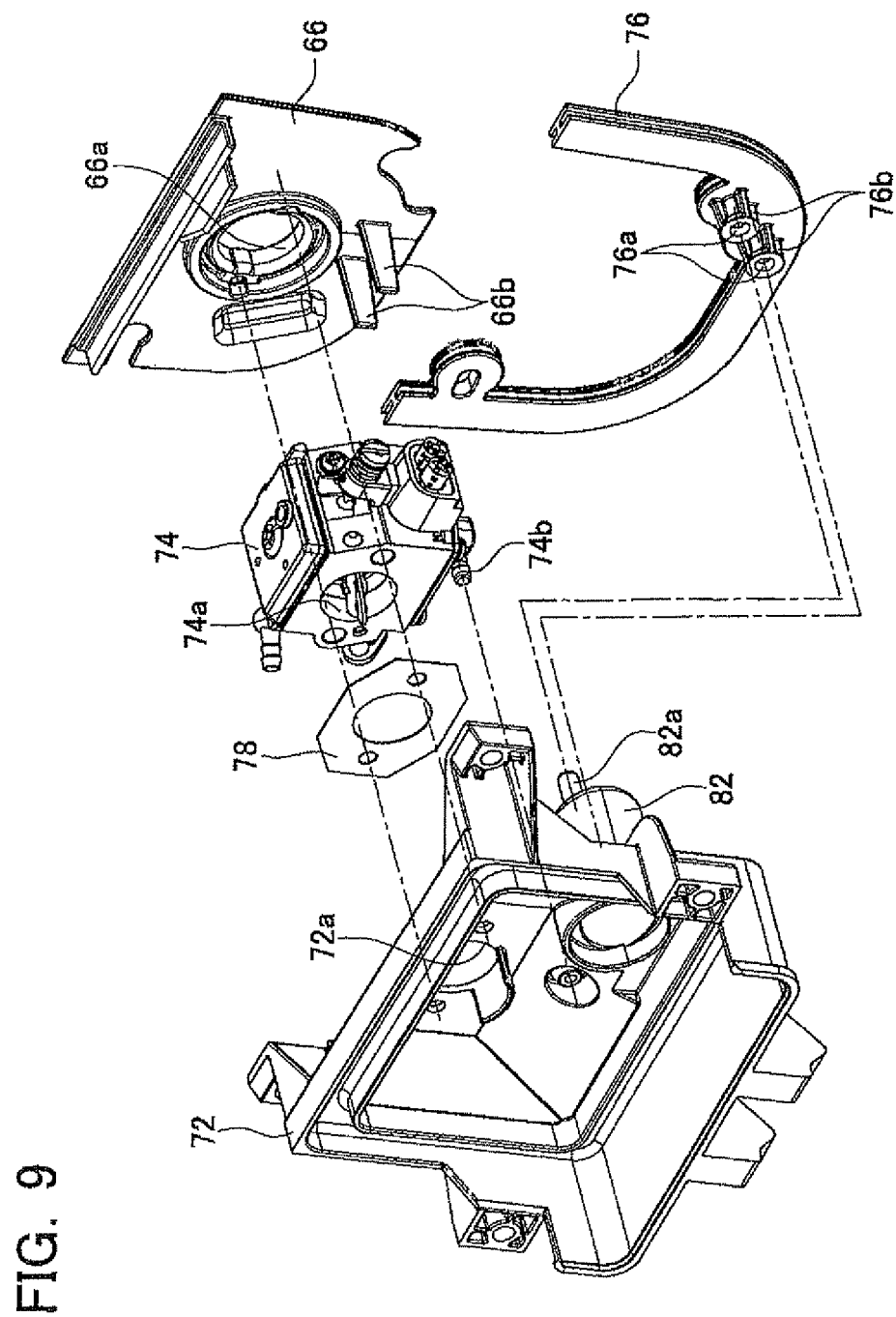
FIG. 9 shows a connection structure of the filter bracket and the carburetor and the carburetor mount.
Figure 10:
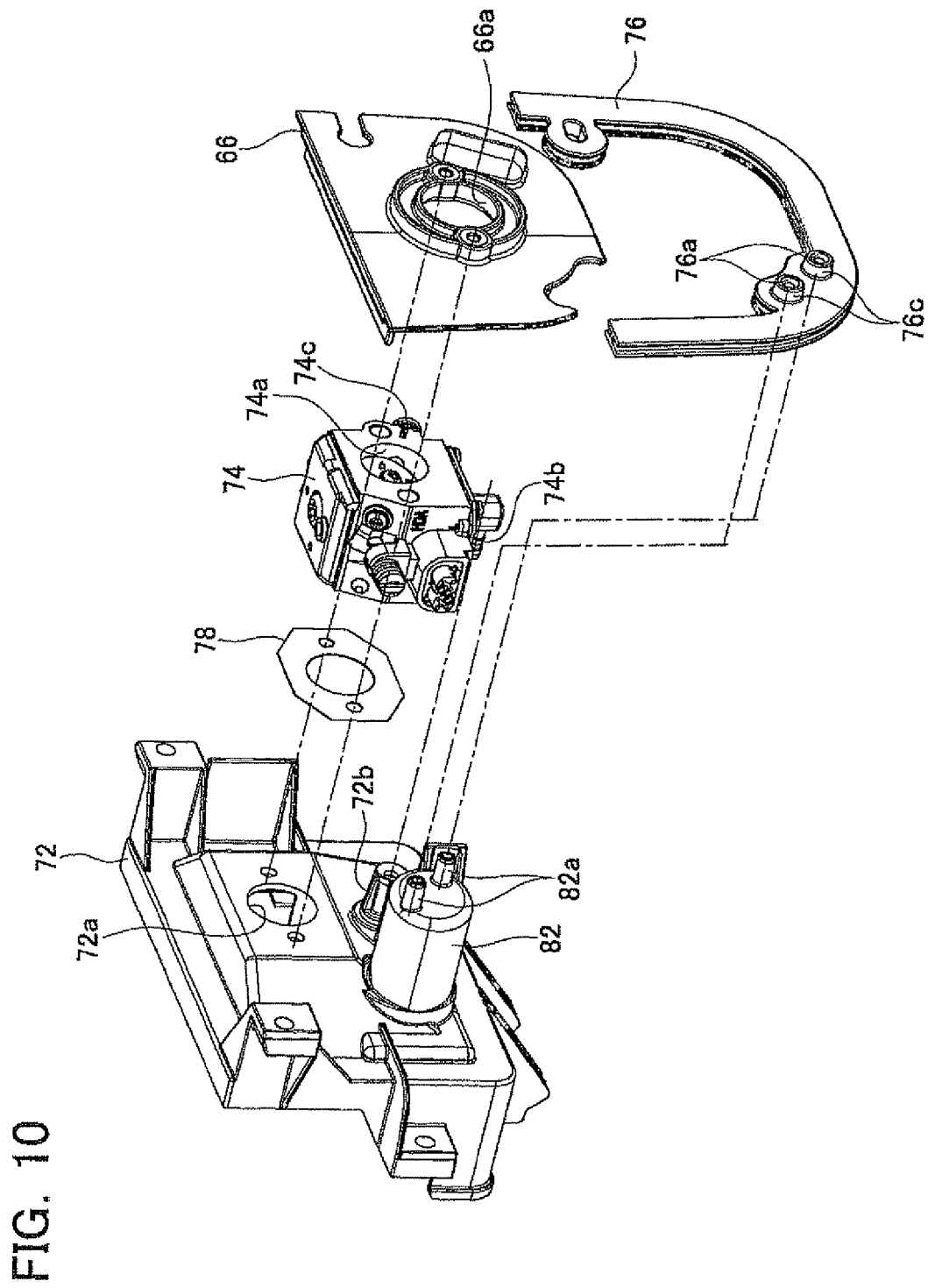
FIG. 10 shows the connection structure of the filter bracket and the carburetor and the carburetor mount from a different direction from that of FIG. 9.

FIG. 9 and FIG. 10 show a connection relationship concerning a flow path constituted of the filter bracket 72, the carburetor 74, the carburetor mount 66, and the seal member 76. As shown in FIG. 9 and FIG. 10, when the filter bracket 72 is assembled to the carburetor mount 66 with the carburetor 74 intervening therebetween, an opening 72a of the filter bracket 72 is connected to an opening 66a of the carburetor mount 66 via a main path 74a of the carburetor 74.

As shown in FIG. 9 and FIG. 10, an oil separator 82 is integrally formed to the filter bracket 72. Moreover, the oil separator 82 is protruding from the filter bracket 72 towards the carburetor 74. In a case where the structure is such that the oil separator 82 protrudes towards the main filter 70, it is not possible to prevent the oil separator 82 from interfering with the main filter 70, and it is necessary to design the filter bracket 72 to be sufficiently larger than the oil separator 82. Meanwhile, if the structure is such that the oil separator 82 protrudes toward the carburetor 74, the oil separator 82 can be easily provided at a position that does not interfere with the carburetor 74 without having to enlarge the filter bracket 72.

Figure 11:
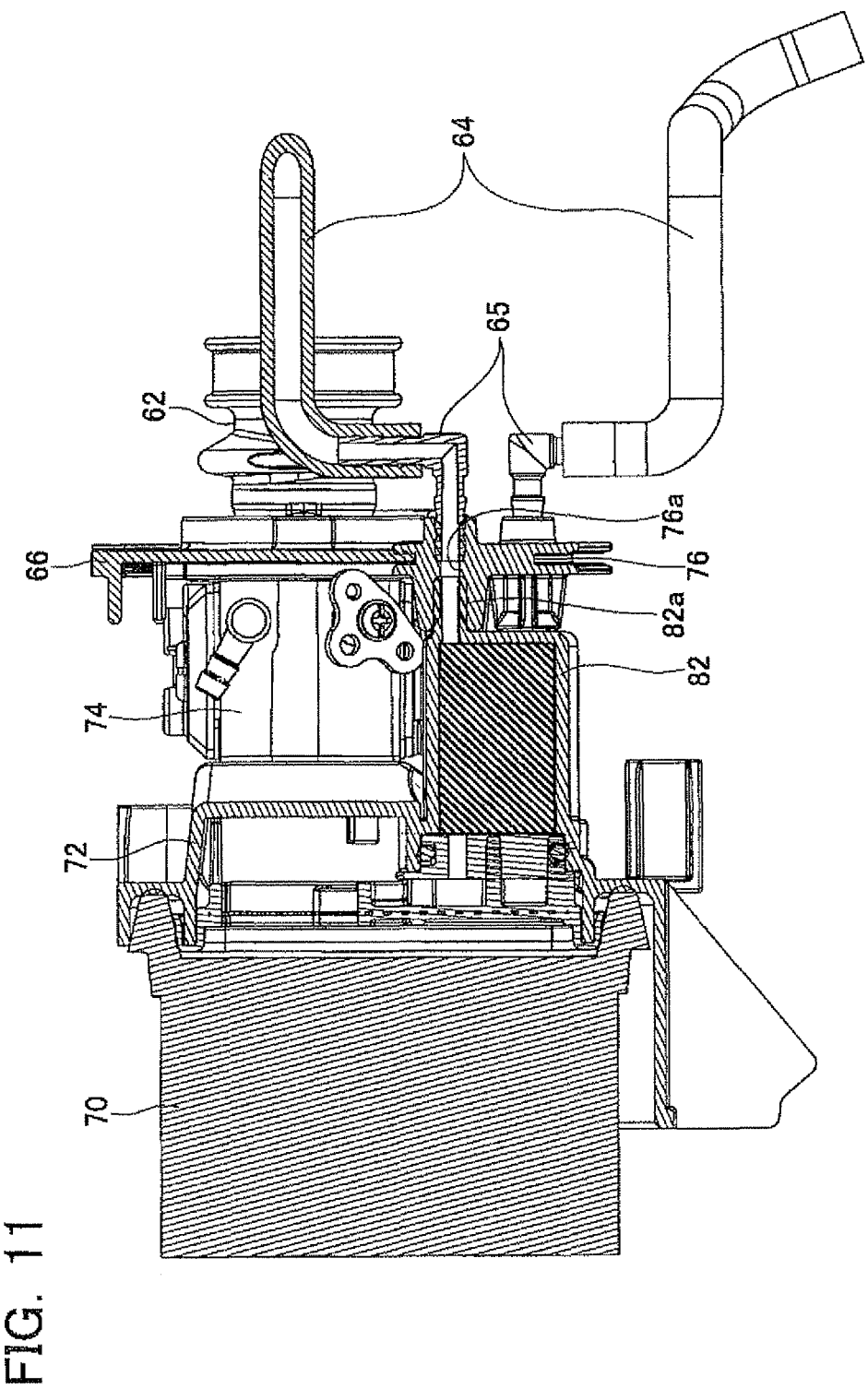
FIG. 11 shows a state where an oil separator and a breathing tube are mutually connected via a through hole of a seal member.

As shown in FIG. 9 and FIG. 10, the seal member 76 is formed with two through holes 76a. The position of the two through holes 76a corresponds to the position of two nipple portions 82a of the oil separator 82. Here, the nipple portion 82a of the oil separator 82 is a connecting opening that protrudes in a tubular shape with a rib, and the through hole 76a of the seal member 76 is a receiving opening for receiving the nipple portion 82a. Note that a periphery 76b, 76c of the through hole 76a is protruding in a tubular shape by a rib at the front and back of the seal member 76. According to the foregoing configuration, when the filter bracket 72 is assembled to the carburetor mount 66 with the carburetor 74 interposed therebetween, as shown in FIG. 11, the respective nipple portions 82a of the oil separator 82 are automatically connected to the corresponding through holes 76a of the seal member 76 from the inside of the casing 20. Subsequently, when the respective breathing tubes 64 are connected to the through holes 76a of the seal member 76 from the outside of the casing 20, and the oil separator 82 and the breathing tube 64 become mutually connected via the through holes 76a. As described above, according to the structure of this embodiment, the troublesome process of connecting the oil separator 82 to the breathing tube 64 within the limited space in the casing 20 is no longer required. Note that, as shown in FIG. 11, the breathing tube 64 is connected to the through hole 76a of the seal member 76 via a joint 65. However, the breathing tube 64 may also be connected directly to the through hole 76a of the seal member 76 without using the joint 65.

As shown in FIG. 10, the carburetor 74 is provided with a hose nipple 74b connected to an air vent. The distal end of the hose nipple 74b extends toward the filter bracket 72. Meanwhile, the filter bracket 72 is provided with an air vent connecting opening 72b at a position corresponding to the hose nipple 74b. According to the foregoing structure, when the filter bracket 72 is assembled to the carburetor mount 66 with the carburetor 74 interposed therebetween, the hose nipple 74b of the carburetor 74 is automatically connected to the air vent connecting opening 72b of the filter bracket 72. Accordingly, the troublesome processing of connecting the host nipple 74b of the carburetor 74 to the air vent connecting opening 72b of the filter bracket 72 using a tube or the like within the limited space in the casing 20 is no longer required.

The assembly structure of the throttle lever 30 and the switch lever 32 is now explained with reference to FIG. 4, FIG. 12, and FIG. 13. As shown in FIG. 4, the throttle lever 30 is supported with the shaft 34, and is swingable around the shaft 34. The throttle lever 30 is connected to the throttle valve of the carburetor 74 via a link 30a. Moreover, the switch lever 32 is also mounted on the same shaft 34 in addition to the throttle lever 30. The switch lever 32 is also swingable around the shaft 34. The switch lever 32 is connected to the choke valve of the carburetor 74 via the link 32a.

Figure 12:
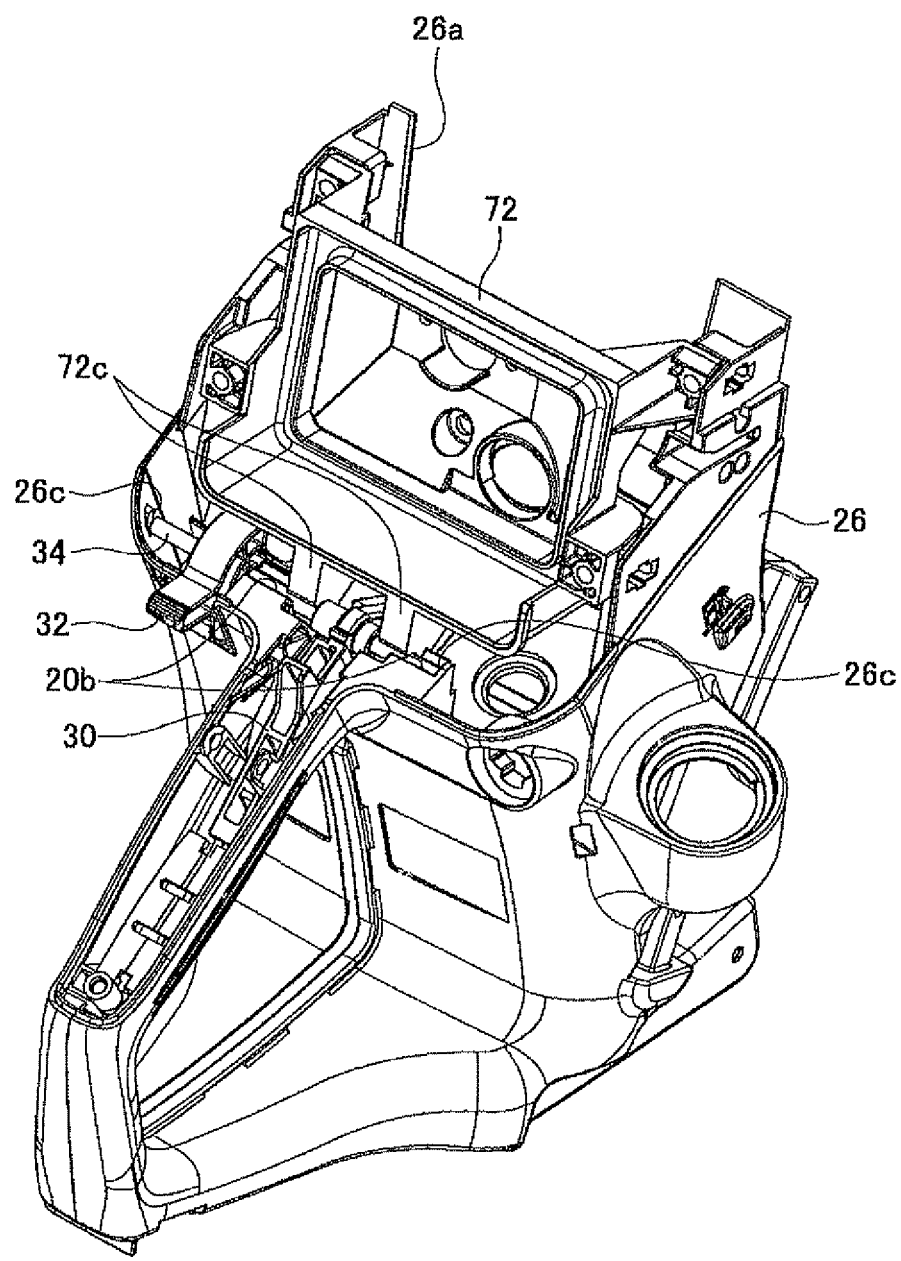
FIG. 12 shows an assembly structure of a throttle lever and a switch lever.
Figure 13:
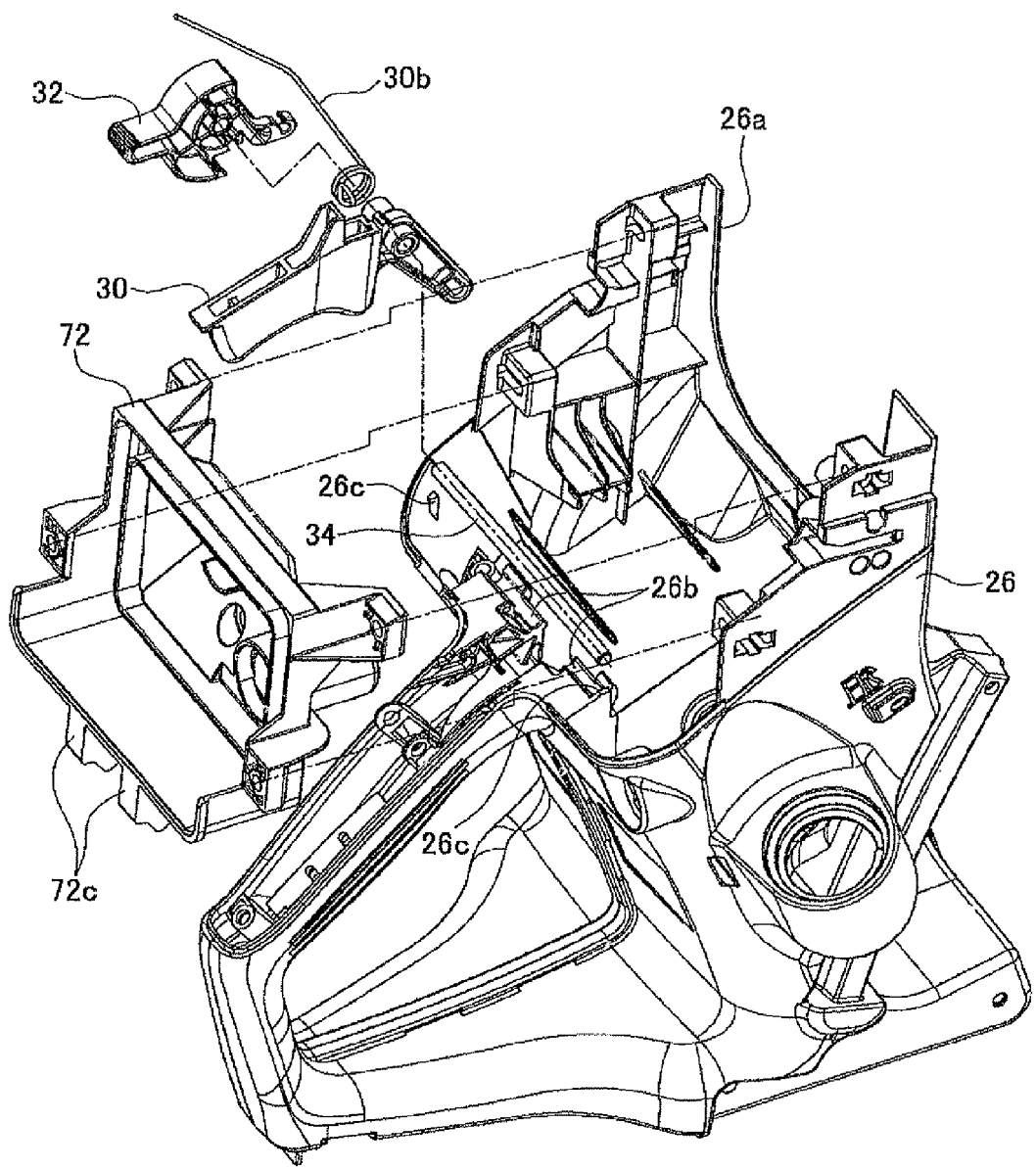
FIG. 13 is an exploded view of an assembly structure of the throttle lever and the switch lever.

FIG. 12 shows a state where the throttle lever 30 and the switch lever 32 are assembled to the casing main body 26, and FIG. 13 shows a state where they are disassembled. As shown in FIG. 12 and FIG. 13, the casing main body 26 is formed with a shaft receiving groove 26b extending in the axial direction of the shaft 34. The shaft receiving groove 26b retains the shaft 34 from its radial direction. Since the upper side of the shaft receiving groove 26b is open, the shaft 34 can be easily fitted into the shaft receiving groove 26b. In particular, the shaft 34 can be fitted into the shaft receiving groove 26b in a state where the throttle lever 30, a spring member 30b, and the switch lever 32 are mounted on the shaft 34 in advance.

Here, when the user operates the throttle lever 30 or the switch lever 32, the respective levers 30, 32 apply downward force to the shaft 34. Meanwhile, the opening direction of the shaft receiving groove 26*b* is facing the upper side. Accordingly, since the opening direction of the shaft receiving groove 26*b* and the direction that the shaft 34 receives the force from the respective levers 30, 32 are mutually different, the shaft 34 is securely retained by the shaft receiving groove 26*b*, and the behavior of the respective levers 30, 32 is thereby stabilized.

In addition, with this embodiment, the shaft receiving groove 26*b* is divided into two sections, and the structure is such that a space surrounding the shaft 34 is formed between the two shaft receiving grooves 26*b*. Accordingly, if the structure is such that one or more shaft receiving grooves 26*b* are provided only in the lengthwise direction of a part of the shaft 34, and space is formed around the shaft 34 in a remaining lengthwise range, the shaft 34 that is mounted on the shaft receiving grooves 26*b* can be easily removed.

As shown in FIG. 12 and FIG. 13, the filter bracket 72 is formed with a shaft holding portion 72*c* at two locations. The shaft holding portions 72*c* come in contact with the shaft 34 retained by the shaft receiving grooves 26*b* from the opening direction of the shaft receiving grooves 26*b* (upper side in this embodiment). According to this structure, it is possible to prevent the shaft 34 retained by the shaft receiving grooves 26*b* from moving or coming loose from the shaft receiving grooves 26*b* without having to provide a separate member for holding the shaft 34. Moreover, as a result of the filter bracket 72 fixed to the casing main body 26 coming in contact with the shaft 34 similarly supported by the casing main body 26, the filter bracket 72 also functions as a support pillar (or beam) within the casing 20, and is able to significantly improve the rigidity of the casing 20.

As shown in FIG. 12 and FIG. 13, the casing main body 26 is provided with a pair of shaft position determining portions 26*c* respectively facing the respective ends of the shaft 34. According to this structure, it is possible to prevent the shaft 34 retained by the shaft receiving grooves 26*b* from moving in the axial direction and coming loose from the shaft receiving grooves 26*b* without having to provide a retaining member such as a circlip to the shaft 34.

Figure 14:
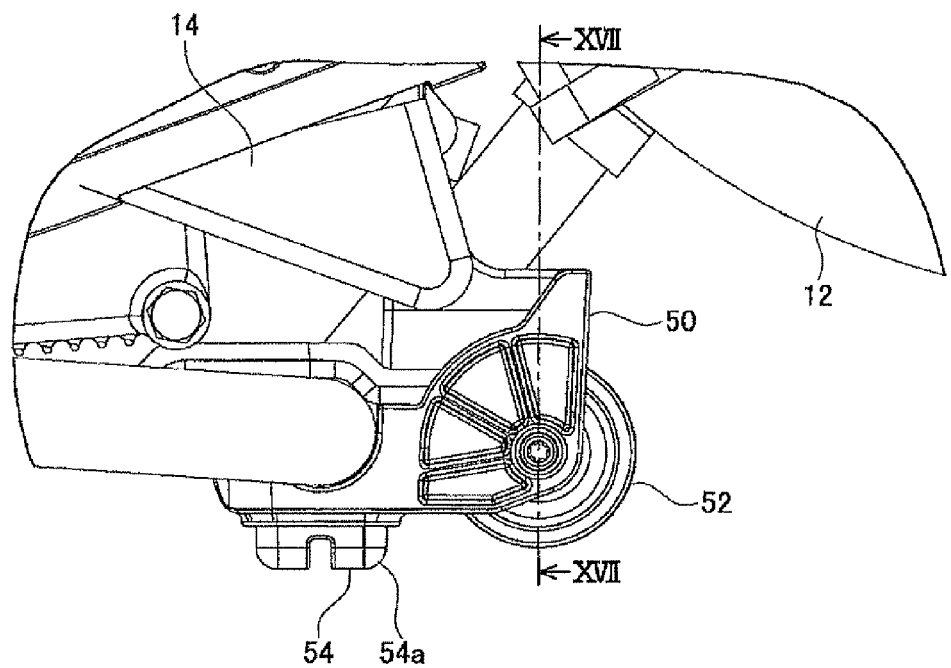
FIG. 14 shows a guard from the right side.
Figure 15:
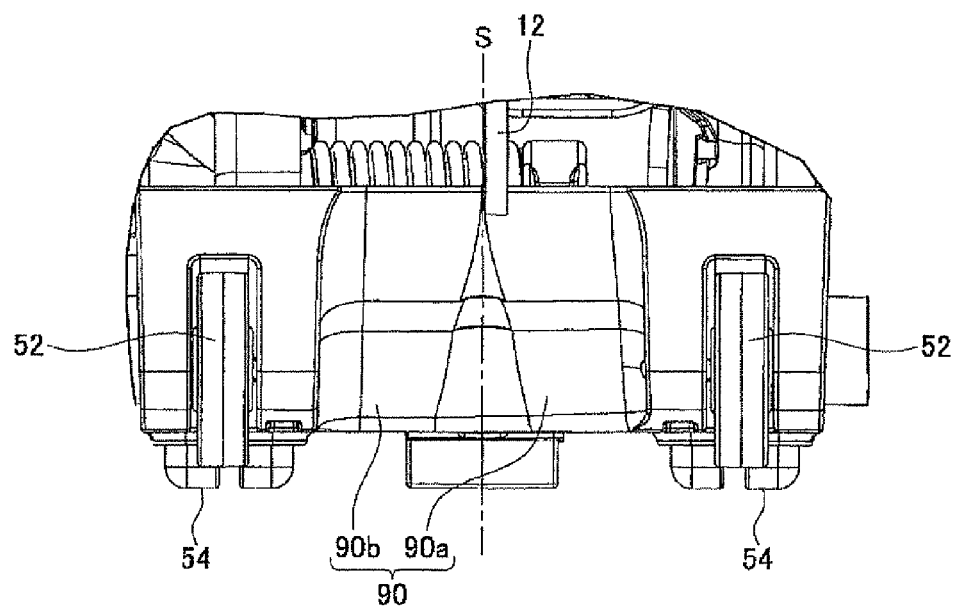
FIG. 15 shows the guard from a front side.
Figure 16:
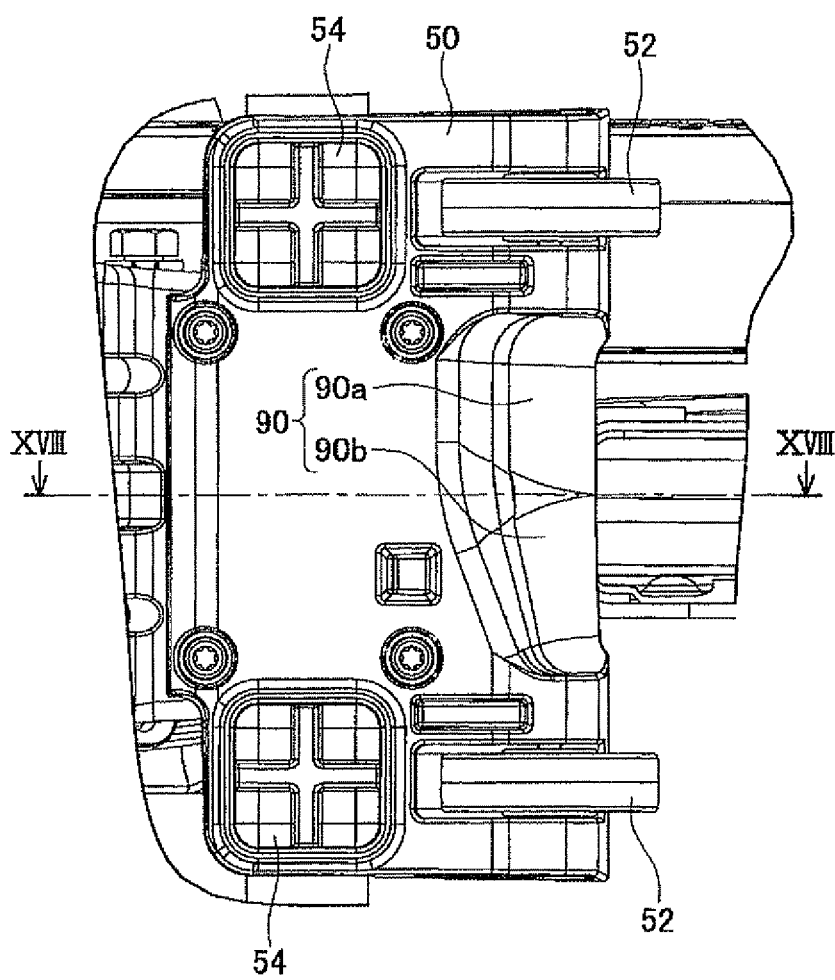
FIG. 16 shows the guard from a bottom side.
Figure 17:
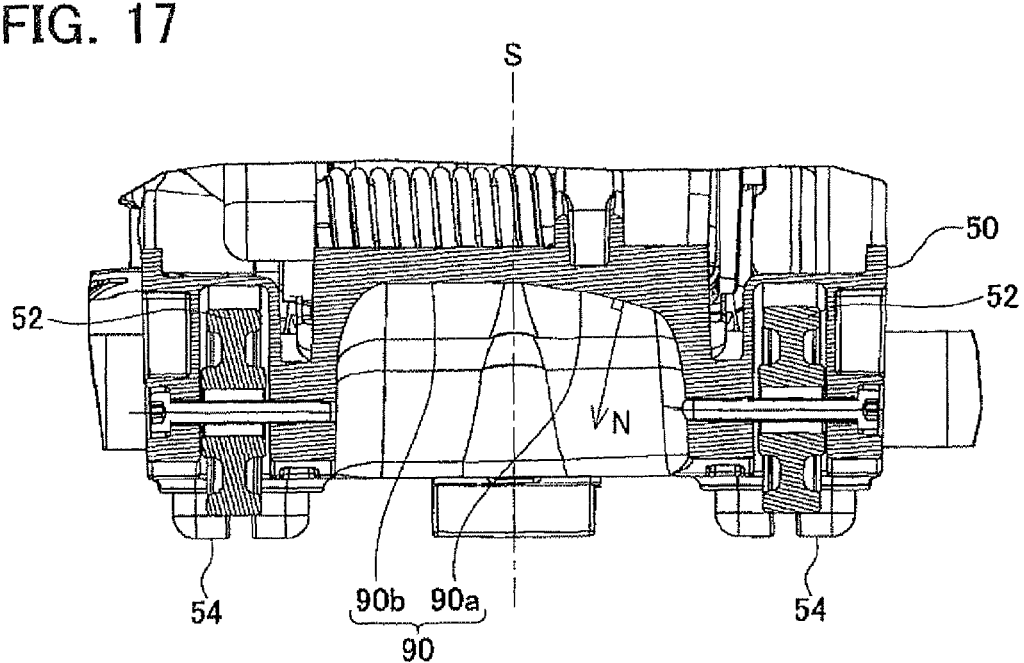
FIG. 17 is a cross sectional view of line XVII-XVII in FIG. 14.
Figure 18:
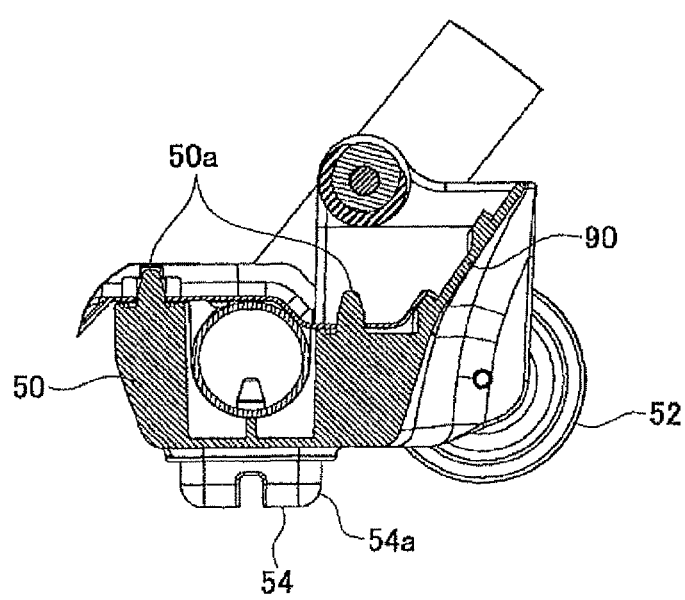
FIG. 18 is a cross sectional view of line in FIG. 16.
Figure 19:
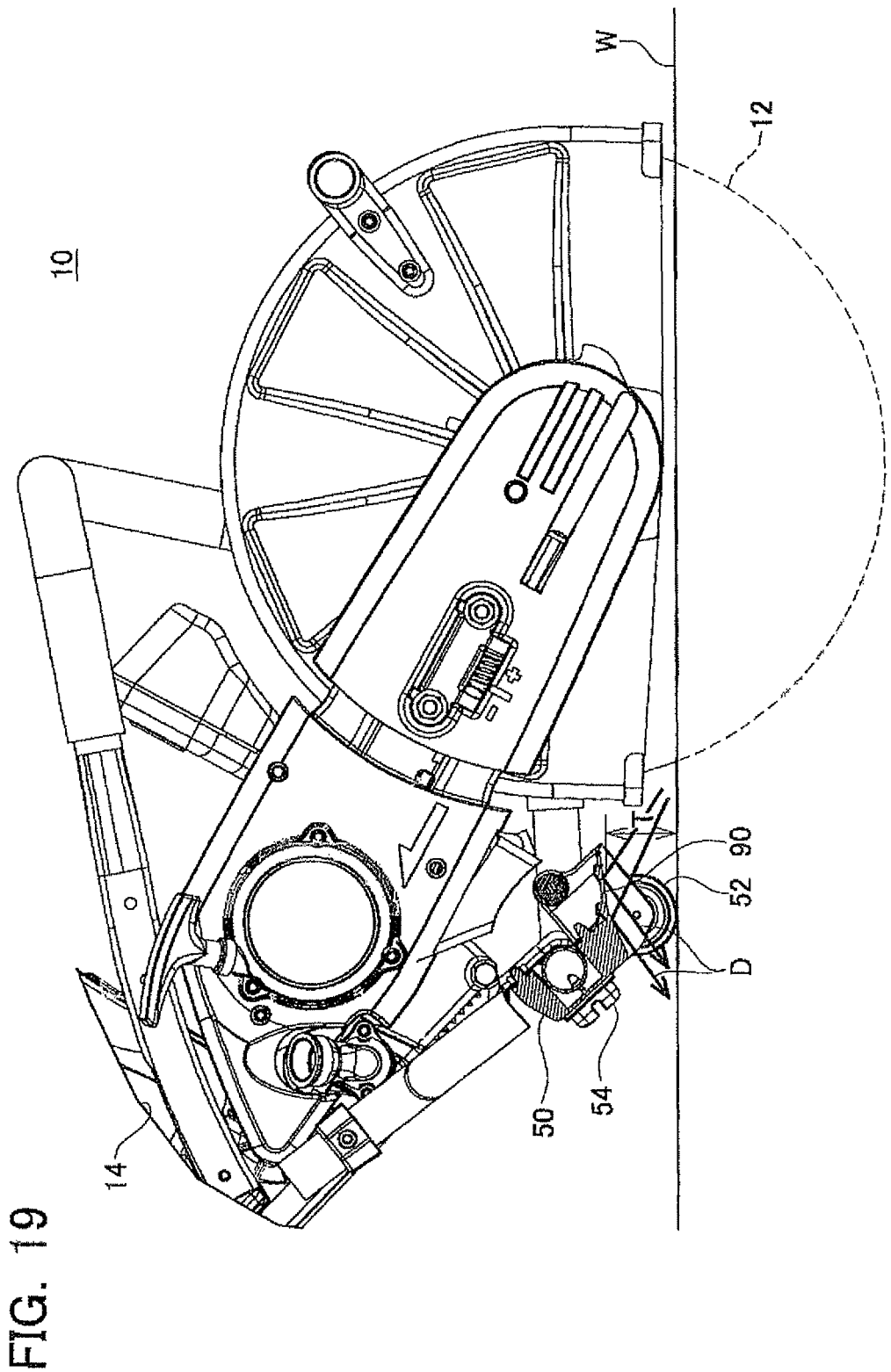
FIG. 19 shows a state where the engine-driven cutter is fully angled towards a surface of a workpiece.

The configuration of the guard 50 is now explained with reference to FIG. 14 to FIG. 19. FIG. 14 is a diagram showing the right side of the guard 50, FIG. 15 is a diagram showing the front side of the guard 50, and FIG. 16 is a diagram showing the lower side of the guard 50. Moreover, FIG. 17 is a cross section of line XVII-XVII in FIG. 14, and FIG. 18 is a cross section of line XVIII-XVIII in FIG. 16. FIG. 19 shows a state where a workpiece W is being cut with the engine-driven cutter 10. Here, a straight line S in the drawings shows a rotating plane of the disk blade 12. The rotating plane S is a virtual plane where the rotating disk blade 12 is positioned, and is a plane that is perpendicular to the rotating axis of the disk blade 12 and which includes the disk blade 12. However, since the disk blade 12 has a limited thickness, the rotating plane S is defined to match the position of one end surface of the disk blade 12. Moreover, an arrow D in FIG. 19 shows the path that the chips of the workpiece W will scatter.

The guard 50 comprises a guard surface 90, a pair of rollers 52, and a front leg portion 54. The front leg portion 54 is molded such that its corner portion 54*a* is formed as a curved surface so that the user can easily angle the engine-driven cutter 10. The pair of rollers 52 is disposed coaxially with the rotating plane S of the disk blade 12 interposed therebetween, and the rotating axis thereof is parallel to the rotating axis of the disk blade 12. The guard surface 90 is provided between the pair of rollers 52. The guard surface 90 is a groove-shaped curved surface formed on the guard 50, and extends along the rotating plane S of the disk blade 12.

As shown in FIG. 18, the guard surface 90 has a tilted surface which basically faces obliquely downward toward the front side. Specifically, the guard surface 90 is tilted to be apart from the surface of the workpiece as the front side position is closer to the disk blade 12. The guard surface 90 repels the chips of the workpiece that scattered from the disk blade 12 toward the lower side of the main body 14. Consequently, it is possible to prevent the chips of the workpiece that scattered from the disk blade 12 in the main body 14 from being repelled toward the user. Note that the guard 50 is formed with a plurality of positioning protrusions 50*a*, and is configured so that it can be easily assembled to the main body 14. Here, the guard surface 90 can be formed as a surface that is free from concave-convex or a surface with little concave-convex so that the chips of the workpiece are smoothly guided to the lower side of the main body 14. However, in another embodiment, grooves and protrusions may be intentionally provided for guiding the chips of the workpiece to a specific direction.

The guard surface 90 has different shapes in a left side (user side) range 90*a* and a right side (driving side) range 90*b* with the rotating plane S as the boundary. Specifically, the guard surface 90 has an asymmetric shape with the rotating plane S as the boundary. Consequently, the guard surface 90 repels the clips scattered from the disk blade 12 asymmetrically to the rotating plane S of the disk blade 12.

In particular, with the guard surface 90 of this embodiment, as shown in FIG. 17, the normal vector N is tilted toward the rotating plane S so as to face the rotating plane S in the entire left side (user side) range 90*a*. To express this differently, in the left side (user side) range 90*a* of the guard surface 90 formed in a groove shape, the depth becomes narrow as it becomes separated from the rotating plane S. Accordingly, in the left side (user side) range 90*a*, the chips that scattered from the disk blade 12 are repelled toward the rotating plane S. Specifically, the chips that scattered from the disk blade 12 to the left side (user side) can be repelled toward the right side (driving side). Consequently, many of the chips that scattered from the disk blade 12 are repelled to the right side (driving side) of the main body 14. The user can use the engine-driven cutter 10 comfortably without being obstructed with the chips as a result of positioning oneself on the left side (user side) as the opposite side.

The shape of the guard surface 90 described above is an example, and the shape of the guard surface 90 is not limited thereto. The shape will suffice so as long as a majority of the chips that scattered from the disk blade 12 can be repelled to the right side (driving side) of the main body 14, and, for example, the angle, depth, and area of the guard surface 90 may be changed between the left side (user side) range 90*a* and the right side (driving side) range 90*b*.

As shown in FIG. 19, the user can move the engine-driven cutter 10 along the surface of the workpiece W in a state of causing the pair of rollers 52 to come in contact with the surface of the workpiece W and angling the engine-driven cutter 10 towards the surface of the workpiece W. Here, even if there is an obstacle (for instance, a fragment of the workpiece W or a protrusion of the workpiece W) on the surface of the workpiece W, it is possible to go over the obstacle by angling the guard surface 90. In particular, with the engine-driven cutter 10 of this embodiment, the pair of rollers 52 are used as the fulcrum, and, even when the engine-driven cutter 10 is fully angled towards the surface of the workpiece W (state of FIG. 19), the guard surface 90 is tilted to become separated from the surface of the workpiece W as it approaches the disk blade 12 (front side). Specifically, a height T from the surface of the workpiece W to the guard surface 90 becomes higher as it approaches the disk blade 12 (front side). According to this structure, regardless of the angle when the engine-driven cutter 10 is angled towards the surface of the workpiece W, it is possible to go over the obstacle existing on the surface of the workpiece W based on the tilt of the guard surface 90.

What is claimed is:

1. A handheld engine-driven cutter comprising:
a disk blade;
a four-stroke engine that drives the disk blade;
a filter through which air provided to the four-stroke engine passes;
a carburetor that mixes fuel and the air that passed through the filter; and
a casing that houses the filter and the carburetor; and
a filter bracket intervened between the filter and the carburetor, the filter bracket guides the air having passed the filter to the carburetor, wherein:
the filter bracket comprises an opening that is connected to the carburetor and an oil separator that is formed integrally with the filter bracket;
the oil separator has a columnar shape that protrudes out from the filter bracket toward a carburetor side in a first direction; and
the oil separator is adjacent to the carburetor connected to the opening in a second direction perpendicular to the first direction.

2. A handheld engine-driven cutter as in claim 1, wherein
the casing includes a carburetor mount to which the filter bracket is connected with the carburetor intervening therebetween, the carburetor mount composing a part of an outer wall of the casing,
a seal member that is made of polymer material and includes a through hole is arranged around a periphery of the carburetor mount,
a breathing tube extending from the four-stroke engine is connected with the through hole of the seal member directly or via a joint from an outer side of the casing, and
a nipple portion formed on the oil separator is connected with the through hole of the seal member from an inner side of the casing.

3. A handheld engine-driven cutter as in claim 2, wherein the carburetor mount includes a recess portion arranged to face a part of the carburetor.

4. A handheld engine-driven cutter as in claim 3, wherein the recess portion of the carburetor mount faces an arm of the carburetor that opens and closes a throttle valve of the carburetor, and the arm is prevented from making contact with the carburetor mount.

5. A handheld engine-driven cutter as in claim 2, wherein the carburetor mount includes a supporting beam portion protruding towards the carburetor, and
the supporting beam portion holds the carburetor at an assembly position upon connecting the filter bracket to the carburetor mount with the carburetor intervening therebetween.

6. A handheld engine-driven cutter as in claim 1, wherein
a hose nipple in which at least a distal end thereof extends towards the filter bracket is disposed on an air vent of the carburetor, and
the filter bracket includes an air vent connecting opening into which the hose nipple is inserted.

7. A handheld engine-driven cutter comprising:
a disk blade;
a four-stroke engine that drives the disk blade;
a filter through which air provided to the four-stroke engine passes;
a carburetor that mixes fuel and the air that passed through the filter;
a casing that houses the filter and the carburetor; and
a filter bracket intervened between the filter and the carburetor, the filter bracket guides the air having passed the filter to the carburetor, wherein:
the filter bracket is formed integrally with an oil separator that protrudes out from the filter bracket toward a carburetor side;
the casing includes a carburetor mount to which the filter bracket is connected with the carburetor intervening therebetween, the carburetor mount composing a part of an outer wall of the casing;
a seal member that is made of polymer material and includes a through hole is arranged around a periphery of the carburetor mount;
a breathing tube extending from the four-stroke engine is connected with the through hole of the seal member directly or via a joint from an outer side of the casing; and
a nipple portion formed on the oil separator is connected with the through hole of the seal member from an inner side of the casing.

8. A handheld engine-driven cutter as in claim 7, wherein the carburetor mount includes a recess portion arranged to face a part of the carburetor.

9. A handheld engine-driven cutter as in claim 8, wherein the recess portion of the carburetor mount faces an arm of the carburetor that opens and closes a throttle valve of the carburetor, and the arm is prevented from making contact with the carburetor mount.

10. A handheld engine-driven cutter as in claim 7, wherein the carburetor mount includes a supporting beam portion protruding towards the carburetor, and
the supporting beam portion holds the carburetor at an assembly position upon connecting the filter bracket to the carburetor mount with the carburetor intervening therebetween.

11. A handheld engine-driven cutter comprising:
a disk blade;
a four-stroke engine that drives the disk blade;
a filter through which air provided to the four-stroke engine passes;
a carburetor that mixes fuel and the air that passed through the filter;
a casing that houses the filter and the carburetor; and
a filter bracket intervened between the filter and the carburetor, the filter bracket guides the air having passed the filter to the carburetor, wherein:
the filter bracket is formed integrally with an oil separator that protrudes out from the filter bracket toward a carburetor side;
a hose nipple in which at least a distal end thereof extends towards the filter bracket is disposed on an air vent of the carburetor; and
the filter bracket includes an air vent connecting opening into which the hose nipple is inserted.

12. A handheld engine-driven cutter as in claim 1, wherein the oil separator has a cylindrical shape.

* * * * *